(12) United States Patent
Pereg et al.

(10) Patent No.: US 11,810,343 B2
(45) Date of Patent: Nov. 7, 2023

(54) ARTIFICIAL INTUITION BASED VISUAL DATA EXTRACTION FOR DISTRIBUTED SYSTEMS

(71) Applicant: Asio Advanced Control Solutions Ltd, Kfar-Monash (IL)

(72) Inventors: Eran Pereg, Tel-Aviv (IL); Reuven Sabi, Ashdod (IL)

(73) Assignee: Asio Advanced Control Solutions Ltd, Kfar-Monash (IL)

( * ) Notice: Subject to any disclaimer, the term of this patent is extended or adjusted under 35 U.S.C. 154(b) by 0 days.

(21) Appl. No.: 17/741,497

(22) Filed: May 11, 2022

(65) Prior Publication Data

US 2022/0366683 A1 Nov. 17, 2022

Related U.S. Application Data

(60) Provisional application No. 63/186,816, filed on May 11, 2021.

(51) Int. Cl.
*G06K 9/62* (2022.01)
*G06V 10/98* (2022.01)
(Continued)

(52) U.S. Cl.
CPC .............. *G06V 10/98* (2022.01); *G06F 18/20* (2023.01); *G06F 18/251* (2023.01);
(Continued)

(58) Field of Classification Search
CPC ...... G06V 10/22; G06V 10/25; G06V 10/255; G06V 10/26; G06V 10/70; G06V 10/72; G06V 10/74; G06V 10/75; G06V 10/764; G06V 10/768; G06V 10/82; G06V 10/84; G06V 10/87; G06V 10/95; G06V 10/955; G06V 10/96; G06V 10/98; G06V 20/40;
(Continued)

(56) References Cited

U.S. PATENT DOCUMENTS 9,195,898 B2 * 11/2015 Huang ................. G06V 10/776
9,424,255 B2 * 8/2016 Pengelly ................ G06V 10/95
(Continued)

OTHER PUBLICATIONS

Hsu et al. "Federated Visual Classification With Real-World Data Distribution", European Conference on Computer Vision, ECCV 2020, LNCS, 12355: 76-92, Published Online Nov. 7, 2020.

*Primary Examiner* — Eric Rush

(57) ABSTRACT

Disclosed herein are methods and systems for visually identifying anomaly events, comprising an edge node configured for applying a limited resources classifier to a plurality of images captured by imaging sensor(s) deployed to monitor a certain scene relating to a certain area to classify object(s) detected in the images, applying a trained context based Machine Learning (ML) model to classification data generated by the limited resources classifier to compute an anomaly score for potential anomaly event(s) relating to the detected object(s) based on one or more contextual attributes associated with the certain scene and transmitting one or more of the images to a remote server in case the anomaly score exceeds a threshold. The remote server is configured to further apply high performance visual analysis tool(s) to visually analyze the received image(s) in order to identify the one or more potential anomaly events.

19 Claims, 14 Drawing Sheets

(51) Int. Cl.
*G06T 7/70* (2017.01)
*G06V 20/50* (2022.01)
*G06V 10/764* (2022.01)
*G06V 10/70* (2022.01)
*G06F 18/25* (2023.01)
*G06V 10/75* (2022.01)
*G06V 10/94* (2022.01)
*G08B 13/196* (2006.01)
*G06V 10/20* (2022.01)
*G06V 20/52* (2022.01)
*G06V 20/40* (2022.01)
*G06F 18/20* (2023.01)

(52) U.S. Cl.
CPC ............. *G06F 18/254* (2023.01); *G06T 7/70* (2017.01); *G06V 10/255* (2022.01); *G06V 10/70* (2022.01); *G06V 10/75* (2022.01); *G06V 10/764* (2022.01); *G06V 10/768* (2022.01); *G06V 10/95* (2022.01); *G06V 20/44* (2022.01); *G06V 20/50* (2022.01); *G06V 20/52* (2022.01); *G08B 13/19604* (2013.01); *G08B 13/19663* (2013.01)

(58) Field of Classification Search
CPC ........ G06V 20/41; G06V 20/44; G06V 20/50; G06V 20/52; G06V 40/10; G06V 40/16; G06V 40/20; G06V 2201/07; G06V 20/70; G06T 7/10; G06T 7/11; G06T 7/194; G06T 7/20; G06T 7/50; G06T 7/70; G06T 2207/10016; G06T 2207/20081; G06T 2207/20084; G06T 2207/20132; G06T 2207/30196; G06T 2207/30201; G06T 2207/30232; G06N 3/0427; G06N 3/0454; G08B 13/189; G08B 13/194; G08B 13/196; G08B 13/19602; G08B 13/19604; G08B 13/19606; G08B 13/19608; G08B 13/19613; G08B 13/19652; G08B 13/19663; H04L 67/04; H04L 67/10; G06F 18/00; G06F 18/20; G06F 18/21; G06F 18/24; G06F 18/25; G06F 18/251; G06F 18/253; G06F 18/254; G06F 18/256; G06F 18/285; G06F 18/30; G06F 18/40

USPC ........ 382/100, 103, 106, 107, 115, 117, 118, 382/153–155, 159, 160, 164, 165, 382/169–171, 173, 181, 224–229, 276, 382/282, 291, 298, 299; 348/61, 77, 135, 348/143, 152–156, 161, 169–172; 706/10, 12, 14–16, 18, 20, 21; 709/201–203, 226

See application file for complete search history.

(56) References Cited

U.S. PATENT DOCUMENTS

| | | | | |
|---|---|---|---|---|
| 10,217,195 | B1* | 2/2019 | Agrawal | G06T 7/11 |
| 10,860,854 | B2* | 12/2020 | Anorga | G06V 20/35 |
| 11,195,398 | B1* | 12/2021 | Fu | G06V 20/52 |
| 2016/0267358 | A1* | 9/2016 | Shoaib | G06V 10/94 |
| 2016/0309096 | A1* | 10/2016 | Hagisu | G06V 20/53 |
| 2017/0091953 | A1* | 3/2017 | Bleiweiss | G06V 20/52 |
| 2018/0089497 | A1* | 3/2018 | Romanenko | G06V 10/255 |
| 2020/0034615 | A1* | 1/2020 | Croxford | G06V 20/00 |
| 2020/0327313 | A1* | 10/2020 | Kedarisetti | G06V 20/52 |
| 2021/0029984 | A1* | 2/2021 | Fryers | G06V 20/00 |
| 2021/0049349 | A1* | 2/2021 | Farokhi | G06V 20/10 |
| 2021/0209369 | A1* | 7/2021 | Timor | G06V 20/52 |
| 2022/0303621 | A1* | 9/2022 | Ahn | G06V 20/44 |

* cited by examiner

ARTIFICIAL INTUITION BASED VISUAL DATA EXTRACTION FOR DISTRIBUTED SYSTEMS

RELATED APPLICATION

This application claims the benefit of priority under 35 USC § 119(e) of U.S. Provisional Patent Application No. 63/186,816 filed on May 11, 2021, the contents of which are incorporated by reference as if fully set forth herein in their entirety.

FIELD AND BACKGROUND OF THE INVENTION

The present invention, in some embodiments thereof, relates to detecting anomaly events in a certain scene, and, more specifically, but not exclusively, to detecting anomaly events in a certain scene based on contextual attributes identified for the certain scene.

The amount of collected data including visual data is ever-increasing in exponential rates as the need increases for analysis and data extraction of relevant information has become essential in many fields, markets and applications, for example, security, automotive, transportation, health, commerce, military and defense to name only a few.

Efficiently analyze such enormous volumes of visual data in order to extract useful data, analytics and/or statistics may consume massive computing resources, for example, processing resources, processing time, storage resources, network resources and/or the like.

Never the less, due to the major need and in many cases the necessity, such extensive computing resources are often invested despite the major challenges and potential costs.

SUMMARY OF THE INVENTION

According to a first aspect of the present invention there is provided a system for visually identifying anomaly events, comprising an edge node comprising one or more processors configured to execute a program code. The program code comprising:

Code instructions to apply a limited resources classifier to a plurality of images captured by one or more imaging sensors deployed to monitor a certain scene relating to a certain area to classify one or more objects detected in one or more of the plurality of images.

Code instructions to apply a trained context based Machine Learning (ML) model to classification data generated by the limited resources classifier to compute an anomaly score for one or more potential anomaly events relating to one or more of the detected objects based on one or more contextual attributes associated with the certain scene.

Code instructions to transmit the one or more images to a remote server in case the anomaly score exceeds a first threshold. The remote server is configured to apply one or more high performance visual analysis tools to visually analyze the one or more images in order to identify the one or more potential anomaly events.

According to a second aspect of the present invention there is provided a method of visually identifying anomaly events, comprising using one or more processor of an edge node for:

Applying a limited resources classifier to a plurality of images captured by one or more imaging sensors deployed to monitor a certain scene relating to a certain area to classify one or more objects detected in one or more of the plurality of images.

Applying a trained context based Machine Learning (ML) model to classification data generated by the limited resources classifier to compute an anomaly score for one or more potential anomaly events relating to one or more of the detected objects based on one or more contextual attributes associated with the certain scene.

Transmitting the one or more images to a remote server in case the anomaly score exceeds a first threshold. The remote server is configured to apply one or more high performance visual analysis tools to visually analyze the one or more images in order to identify the one or more potential anomaly events.

According to a third aspect of the present invention there is provided a computer program product for visually identifying anomaly events, comprising one or more computer readable storage media having thereon:

First program instructions executable by one or more processor to cause the one or more processor to apply a limited resources classifier to a plurality of images captured by one or more imaging sensors deployed to monitor a certain scene relating to a certain area to classify one or more objects detected in one or more of the plurality of images.

Second program instructions executable by the one or more processor to cause the one or more processor to apply a trained context based Machine Learning (ML) model to classification data generated by the limited resources classifier to compute an anomaly score for one or more potential anomaly events relating to one or more of the detected objects based on one or more contextual attributes associated with the certain scene.

Third program instructions executable by the one or more processor to cause the one or more processor to transmit the one or more images to a remote server in case the anomaly score exceeds a first threshold. The remote server is configured to apply one or more high performance visual analysis tools to visually analyze the one or more images in order to identify the one or more potential anomaly events.

In a further implementation form of the first, second and/or third aspects, one or more of the contextual attributes relate to a size of the one or more object identified in the one or more image.

In a further implementation form of the first, second and/or third aspects, one or more of the contextual attributes relate to a position of the one or more object identified in the one or more image.

In a further implementation form of the first, second and/or third aspects, one or more of the contextual attributes relate to a dynamic location of the one or more object tracked in a plurality of consecutive images of the plurality of images.

In a further implementation form of the first, second and/or third aspects, one or more of the contextual attributes relate to an aspect ratio of the one or more object.

In a further implementation form of the first, second and/or third aspects, one or more of the contextual attributes relate to one or more of a plurality of environmental conditions identified in the one or more image, the one or more environmental condition is a member of a group consisting of: an illumination condition, a visibility condition and a weather condition.

In a further implementation form of the first, second and/or third aspects, one or more of the contextual attributes are learned by the context based ML model based on historical classification data analyzed and labeled accordingly by the remote server using the one or more high performance visual analysis tool.

In a further implementation form of the first, second and/or third aspects, one or more of the processors of the edge node are further configured to transmit to the remote server one or more background images of the scene. The one or more processors create the one or more background images by applying one or more background subtraction tools to at least some of the plurality of images.

In a further implementation form of the first, second and/or third aspects, one or more of the processors are configured to transmit one or more updated background images of the scene according to one or more operation modes. The one or more operation modes are members of a group consisting of: periodically, in response to one or more changes detected in the scene and/or on request by the remote server.

In a further implementation form of the first, second and/or third aspects, the context based ML model is further configured to compute the anomaly score for one or more of the objects based on a distance of one or more of the objects from the one or more imaging sensor. The distance is determined based on depth data computed for the scene by the remote server based on one or more of the background images of the scene received from the edge node.

In a further implementation form of the first, second and/or third aspects, the context based ML model is further configured to compute the anomaly score for one or more of the objects based on segmentation of the scene background generated by the remote server based on one or more of the background images of the scene received from the edge node.

In an optional implementation form of the first, second and/or third aspects, one or more of the processors are further configured to further analyze one or more of the images in case the anomaly score exceeds a second threshold lower than the first threshold by:

Applying the limited resources classifier to one or more regions of interest cropped from one or more of the images in which one or more of the potential anomaly events are detected.

Applying the trained context based ML model to the classification data generated by the limited resources classifier for the one or more regions of interest to compute the anomaly score for one or more of the potential anomaly events.

Transmitting one or more of the images to the remote server in case the anomaly score exceeds the first threshold.

In a further implementation form of the first, second and/or third aspects, the anomaly event relates to a presence of the one or more objects detected in the certain scene.

In a further implementation form of the first, second and/or third aspects, the anomaly event relates to one or more actions conducted by one or more of the objects detected in the certain scene.

In a further implementation form of the first, second and/or third aspects, the limited resources classifier is configured for high false positive detection to reduce false negative anomaly detections at the expense of increased false positive anomaly detections.

In an optional implementation form of the first, second and/or third aspects, one or more of the plurality of images are down-sampled prior to applying the limited resources classifier to the one or more images.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
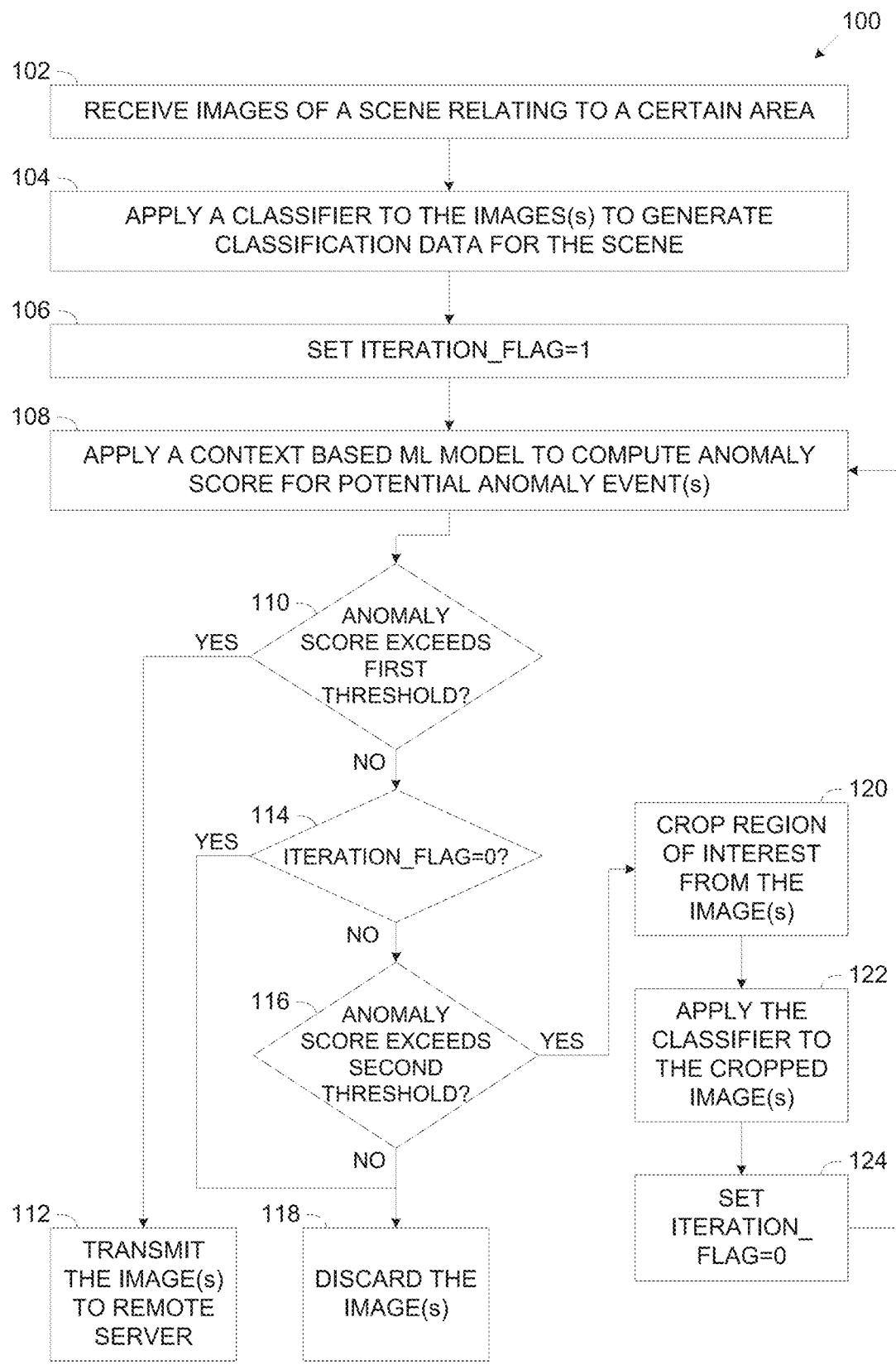
FIG. 1 is a flowchart of an exemplary process of identifying anomaly events in a certain scene relating to a certain area based on contextual attributes associated with the scene, according to some embodiments of the present invention.

The present invention, in some embodiments thereof, relates to detecting anomaly events in a certain scene, and, more specifically, but not exclusively, to detecting anomaly events in a certain scene based on contextual attributes identified for the certain scene.

Visual data extraction in general and anomaly detection in particular may be highly desirable for a plurality of applications ranging from security and monitoring applications, through public order maintenance applications to medical and military applications.

However, efficiently extracting visual data of monitored scenes relating to respective area may present major challenges. In order to support high quality visual data extraction and accurate anomaly detection for each scene, high quality (e.g. high resolution) visual data must be captured, for example, by one or more imaging sensors, for example, a camera, a video camera, a thermal imaging camera, an Infrared (IR) sensor, a night vision sensor and/or the like deployed to monitor each scene and capture images of the respective scene. Processing this high quality visual data may naturally consume extensive computing resources, for example, processing resources, storage resources, networking resources and/or the like.

The need for such extensive computing resources may present major limitations since while the high quality visual data originates from imaging sensors deployed at the physical monitored locations and connect to the network via access devices deployed at the network edge, edge nodes deployed and available at the network edge may be significantly limited in their computing resources. On the other hand, remote servers having extensive computing resources, for example, high performance servers, server farms, data centers, cloud services and platforms and/or the like may be located far from the network edge. Transmitting the high quality visual data (images) from the network edges to the remote servers may consume a massive network bandwidth which may be inefficient, highly costly and in many cases unavailable.

According to some embodiments of the present invention, there are provided methods, systems, devices and computer software programs for extracting visual data and identifying potential anomaly events in one or more scenes relating to respective physical area based on contextual attributes associated with each of the scenes.

In particular, the data extraction and anomaly detection is split between two entities, the limited resources edge node deployed at the network edge in close network proximity to the imaging sensor(s) monitoring the scene and the remote server located further in the network which has extensive and practically unlimited computing resources. The edge node may be therefore configured to analyze the visual data to identify events in the scene which are estimated with high probability to be actual (real) anomaly events and transmit only the relevant very limited volume of visual data relating to the high probability potential anomaly events to the remote server for further high-performance through analysis.

A plurality of edge nodes may be deployed to support preliminary visual data analysis, where each network edge may be assigned to and/or associate with one or more respective scenes relating to area and/or locations covered and/or served by the network edge in which the respective edge node is deployed.

The edge node may receive high quality (e.g. high resolution) visual data of the scene, for example, images, video sequences and/or the like from the imaging sensors deployed to monitor the scene. Since the edge node is located in close network proximity to the imaging sensor(s), the network bandwidth required for transferring the visual data may be available at low and typically insignificant cost.

The edge node may apply a classifier to analyze the visual data as known in the art and generate classification data accordingly, for example, a label, a bounding box, a location, a dimension, an aspect ratio, a distance, a motion vector and/or the like of one or more objects, actions, events, conditions, situations, states, scenarios and/or the like detected in the images.

However, since the edge node may be limited in its computing resources, the classifier, for example, a classification function, a classification algorithm, a neural network, a Support Vector Machine (SVM) and/or the like may be a low-end limited resources and lean classifier which may thus have reduced performance of the detection and/or classification, for example, reduced accuracy, reduced reliability, lower consistency, less robustness and/or the like.

Moreover, in order to further reduce the computing resources consumed by the classifier, the high quality visual data, i.e. the images may be first down-sampled, for example, to reduce its resolution before applying the classifier to the images which may further reduce the classifier performance in detecting and classifying the content of the images.

In order to compensate for the reduced performance of the low-end classifier, the edge node may apply a trained context based Machine Learning (ML) model, for example, a neural network, a deep neural network, an SVM and/or the like to the classification data generated by the classifier. In particular, the low-end classifier executed at the edge node may be configured for high false positive detection in order to reduce and practically eliminate missing real (positive) anomaly events making the low-end classifier highly "noisy", meaning that it may classify non-anomaly events as anomaly events. The context based ML model may be therefore applied to filter out the false positive anomaly events detected by the low-end classifier and pass through only potential anomaly events estimated to be anomalies with high probability, specifically with respect to characteristics of for the specific scene.

Specifically, the context based ML model may be applied to compute an anomaly score for one or more potential anomaly events detected by the low-end classifier based on one or more contextual attributes associated with the specific scene portrayed (depicted) in the visual data. Such anomaly events may include, for example, detection of potential anomalous objects in the scene, detection of potential anomalous actions conducted by objects identified in the scene and/or the like.

The context based ML model may therefore evaluate the performance (e.g. accuracy, reliability, consistency, etc.) based on the contextual attributes associated with the specific scene and may compute and/or adjust the anomaly score accordingly.

The contextual attributes which associated with each scene may differ from one scene to another and each context based ML model may be therefore trained, adjusted and/or learned to adapt to the specific contextual attributes characterizing the specific scene to which the respective context based ML model is assigned.

The contextual attributes may include, for example, one or more dimensions of objects detected in the scene, for example, a size, a distance, a height, a length, a width, a depth and/or the like. In another example, the contextual attributes may include one or more spatial attributes, for example, position, location and/or orientation data relating to one or more objects detected in the scene. In another example, the contextual attributes may include temporal data, for example, tracking data indicative of dynamic locations of one or more objects tracked in the scene. In another example, the contextual attributes may include segmentation data segmenting the scene, in particular the scene background such that objects may be accurately identified and/or efficiently distinguished from each other. In another example, the contextual attributes may include historical data (interchangeable designated historical classification data) indicative of one or more objects, actions, events, conditions, situations, states, scenarios and/or the like typical, acceptable and/or approved for the scene.

Some of the contextual attributes may be based and/or derived from data received from the remote server. For example, the edge node may generate occasionally, periodically and/or on request one more high quality background images of the scene which may be transmitted to the remote server. The remote server may generate depth data for the scene based on the background image(s) and transmit the depth data back to the edge node. The context based ML model executed at the edge node may analyze the depth data to extract one or more of the contextual attributes, for example, a dimension, a location, a distance and/or the like. Based on the background image(s), the remote server may further generate the segmentation data used by the context based ML model.

After the context based ML model computes and/or adjusts the anomaly score for the potential anomaly event(s) detected in the scene, the anomaly score may be compared to one or more thresholds and the edge node may take one or more actions accordingly. For example, in case the anomaly score exceeds a certain (first) threshold, specifically a relatively high threshold (e.g. 0.8, 0.85, 0.9 in the range of 0 to 1), one or more images in which the potential anomaly event(s) are detected may be transmitted to the remote server.

The remote server having practically unlimited computing resources may further analyze the image(s) using one or more high-end visual analysis tools, for example, a high-performance classifier, a high-performance computer vision tool, a high-performance image processing algorithms and/or the like in order to accurately detect and classify accordingly the potential anomaly event(s).

In case the anomaly score does not exceed another (second) threshold, specifically a relatively low threshold lower than the first threshold (e.g. 0.6, 0.65, 0.7), the respective images may be discarded.

Optionally, one or more of the images, in particular image(s) for which the computed anomaly score is in the range between the first and second thresholds, may be further analyzed. In particular, the original high quality images may be cropped and the low-end classifier may be applied to analyze the cropped image(s) and generate classification data accordingly. The edge node may again apply the context based ML model to the classification data generated for the cropped image(s) in order to compute and/or adjust the anomaly score again based on the contextual attributes of the scene. Once again the resulting anomaly score may be compared to the thresholds and the edge node may take further action accordingly as described here in before.

Applying the context based ML model at the edge node to compute the anomaly score for the potential anomaly events detected by the low-end classifier may present major benefits and advantages over currently existing methods and systems for visual data extraction, specifically for anomaly detection.

First, analyzing the images limited resources and typically low-end and cheap edge nodes may significantly reduce the deployment costs of the split data extraction and anomaly detection solution which in turn may lead to its fast and extensive adoption for a plurality of diverse applications and market segments over large geographical areas.

Moreover, analyzing the images at the edge node and selecting only a limited and typically very small number of images that are actually sent to the remote server may significantly reduce the network bandwidth and/or the latency of transferring the visual data of the scenes to the remote server compared to existing methods in which massive volumes of visual data are transmitted to the remote server for high performance analysis. Reducing the network bandwidth may further reduce the deployment costs of the split data extraction and anomaly detection solution.

Furthermore, applying the context based ML model to compensate for the reduced performance of the edge node low-end classifier by evaluating the classification data generated by the low-end classifier based on the specific contextual attributes associated with the specific scene and computing the anomaly score accordingly may significantly increase the accuracy, reliability, consistency and/or robustness of the detected potential anomaly event(s) and its anomaly score.

In addition, training, adjusting and/or learning each context based ML model to identify and use the contextual attributes specific to the specific scene which may vary between scenes may further may increase the accuracy, reliability, consistency and/or robustness of the detected potential anomaly event(s) and its anomaly score.

Also, while unable to process a complete high quality image, the low-end classifier may be able to process one or more portions of one or more of the high quality images, for example, a cropped image. Therefore, cropping one or more of the images which are inconclusively classified by the low-end classifier and the context based ML model and applying the low-end classifier to the reduced size but high resolution cropped image(s) may enable the low-end classifier to better detect and classify the content of the cropped image(s) portion(s). The context based ML model may be then applied again to the classification data generated by the low-end classifier for the cropped image(s) to compute and/or adjust the anomaly score which may be therefore more accurate and/or reliable.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the figures, FIG. 1 is a flowchart of an exemplary process of identifying anomaly events in a certain scene relating to a certain area based on contextual attributes associated with the scene, according to some embodiments of the present invention.

An exemplary process 100 may be executed by an edge node to extract data in general, for example, to support detection of potential anomaly events in a certain scene relating to a certain physical area, for example, detection of potential anomalous objects in the scene, detection of potential anomalous actions conducted by objects identified in the scene and/or the like.

The anomaly detection is done in two stages, the first stage executed at the edge node comprises analyzing visual data to identify potential anomaly events and extracting only visual data that relates (depicts, portrays, etc.) to the identified potential anomaly events. In case probability and/or confidence of the potential anomaly event(s) detected at the edge node exceed a certain level (threshold) the second stage is initiated. The second stage which is conducted at a remote server may comprises further in-depth, through and extensive analysis of the visual data extracted at the edge node to reliably determine whether the potential anomaly events are indeed anomalies or not.

In particular, the edge node may reliably identify the potential anomaly events based on one or more contextual attributes learned and associated with the certain scene. To this end the edge node may apply a low-end, limited resources classifier to analyze visual data, i.e., images depicting the scene and generate classification data. The edge node may further use a trained context based ML model configured to evaluate the classification data generated by the low-end classifier with respect to the contextual attributes of the certain scene in order to identify the potential anomaly events and compute a reliable anomaly score for these anomaly events.

In case the anomaly score computed for a certain potential anomaly event exceeds a certain threshold, one or more images depicting the potential anomaly event may be transmitted to the remote server. The remote server having abundant computing resources may be configured to apply one or more high-end, high performance visual analysis tools to for further analyze the image(s) in order to classify the potential anomaly event in an accurate, reliable, robust and/or consistent manner.

A plurality of edge nodes may be deployed at a plurality of network edges at a plurality of locations and/or areas to support anomaly detection in these locations. Each of these edge nodes may execute one or more classifiers each coupled with a respective on of a plurality of trained context based ML model. However, each of the context based ML models may be trained, adjusted and learned according to the specific contextual parameters associated with the specific scene the respective context based ML model is assigned to such that the context based ML model may be specifically adapted for its assigned scene thus computing significantly more accurate anomaly cores.

Figure 2A:
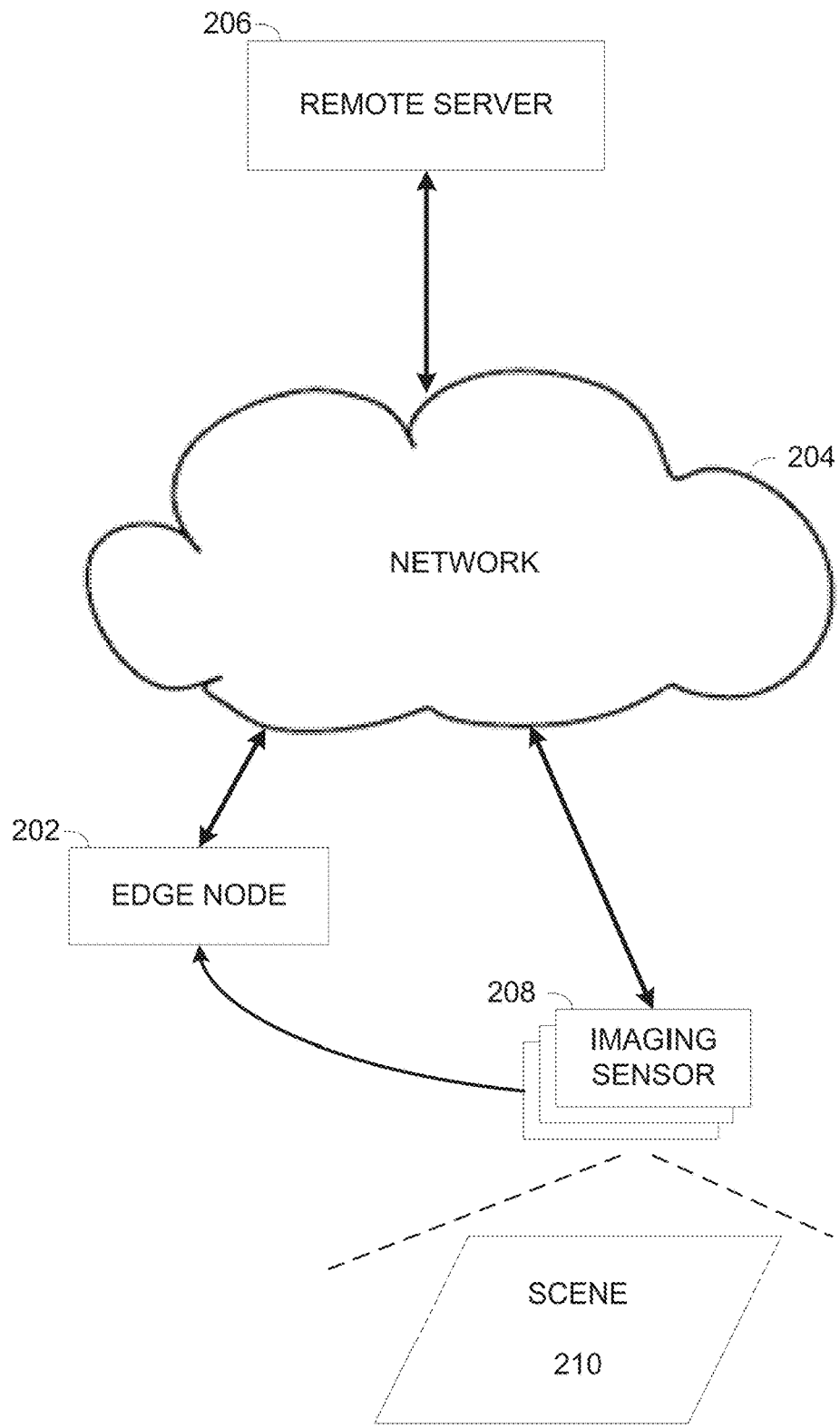
FIG. 2A, FIG. 2B and FIG. 2C are schematic illustrations of an exemplary system for identifying anomaly events in a certain scene relating to a certain area based on contextual attributes associated with the scene, according to some embodiments of the present invention.
Figure 2B:
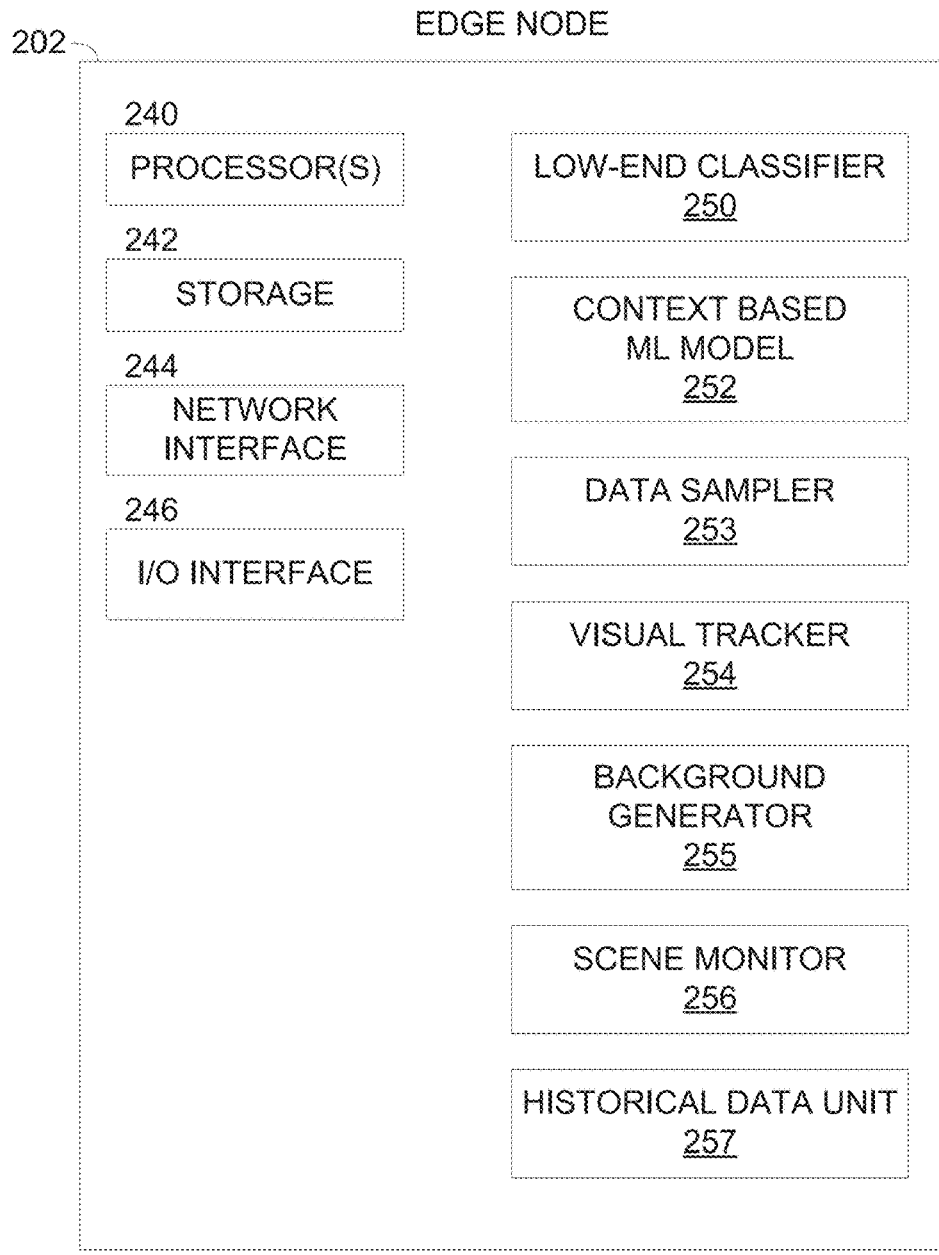
Figure 2C:
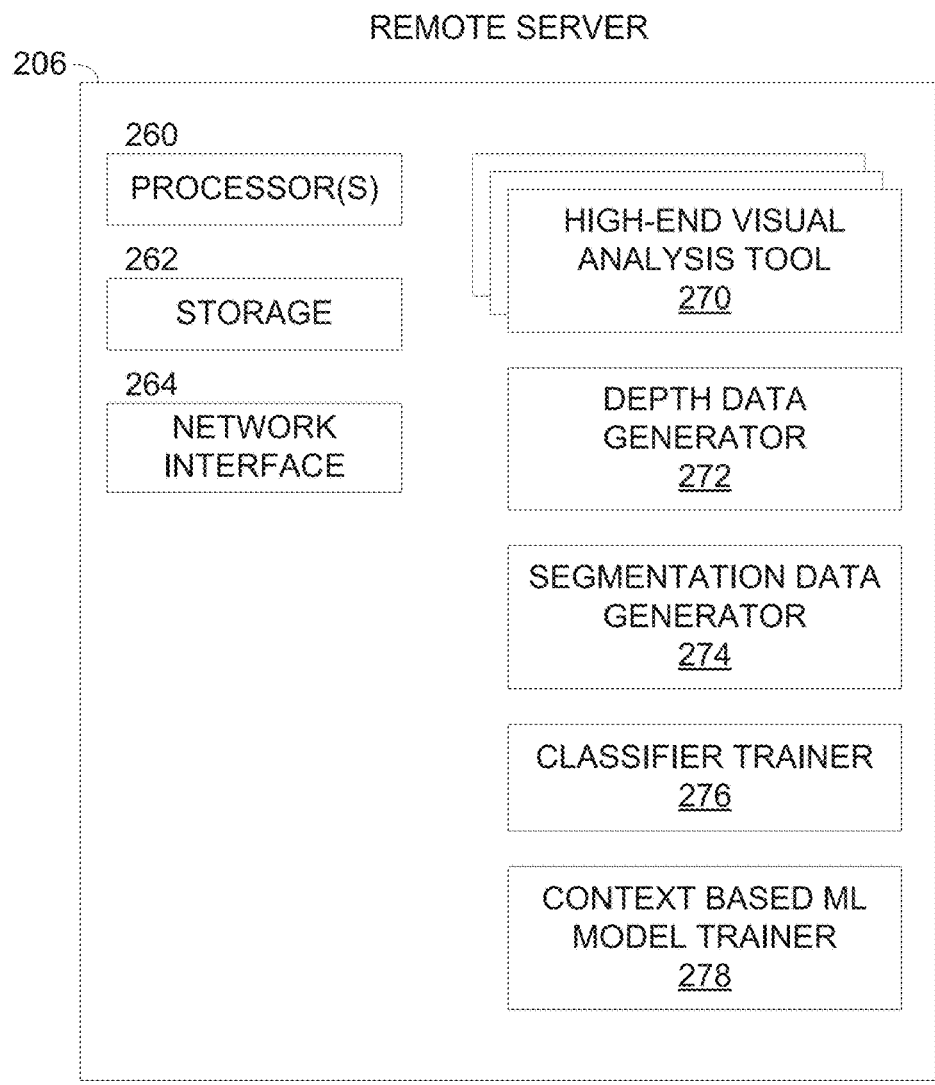

Reference is also made to FIG. 2A, FIG. 2B and FIG. 2C, which are schematic illustrations of an exemplary system for identifying anomaly events in a certain scene relating to a certain area based on contextual attributes associated with the scene, according to some embodiments of the present invention.

As seen in FIG. 2A, an edge node 202, for example, a server, a processing node, a cluster of processing nodes, a gateway, an access point and/or the like may be deployed at an edge of a network 204 comprising one or more wired and/or wireless networks, for example, a Local Area Network (LAN), a Wireless LAN (WLAN, e.g. Wi-Fi), a Wide Area Network (WAN), a Metropolitan Area Network (MAN), a cellular network, the internet and/or the like. The edge node 202 deployed at the edge of the network 204 may be therefore in close network proximity (e.g. few hops) to one or more access points of the network 204 providing network connectivity to end devices, for example, client devices (e.g. cellular phones, tablets, computers, etc.), monitor and/or control devices (e.g. sensors, controllers, IoT devices, etc.), vehicle mounted devices and/or the like.

Typically, a large number of edge nodes 202 may be deployed at multiple different geographical locations. The edge node 202 may be therefore typically limited in size and/or cost and may thus have limited computing resources, for example, limited processing power, limited storage resources and/or the like.

The edge node 202 may communicate via the network 204 with one or more remote servers 206, for example, a server, a processing node, a cluster of processing nodes, a cloud service, a cloud platform and/or the like. In contrast to the edge node 202, the remote server 206 which is a centralized unit that may serve a plurality of edge nodes 202 may therefore have abundant computing resources.

In some network deployments and/or constructions the edge node 202 and/or the remote servers 206 may be regarded or considered as part of the network 204. However, for clarity the network 204 is portrayed as networking infrastructure separated from the edge node 202 and the remote server 206.

The edge node 202 may further communicate with one or more imaging sensors 208 deployed to monitor a certain scene 210 relating to a certain area, specifically a certain physical area. The certain scene 210 may relate (e.g. portray, depict, etc.) to a single specific area, for example, a geographical area, a certain location and/or the like. However, the certain scene 210 may also relate to a certain type of area meaning that the certain scene 210 may relate to a plurality of distinct area and/or locations which share very similar visibility and/or scenery characteristics and attributes, for example, a sea viewed from a naval vehicle (e.g. ship, submarine, etc.), a sky segment viewed from an aircraft, a desert viewed from above and/or from ground level and/or the like.

The imaging sensors 208 configured to capture visual data, for example, images, video sequences and/or the like may include a wide range of sensors and/or devices employing on or more imaging technologies, for example, a camera, a video camera, a thermal imaging camera, an Infrared (IR) sensor, a night vision sensor and/or the like.

Typically, the view of the scene 210 by each imaging sensor 208, for example, in terms of distance from the scene 210, altitude above the scene 210, Field of View (FOV) of the scene 210 and/or the like may be highly static over extended periods of time such that each imaging sensor 208 may have a significantly constant view of the scene 210 for at least a certain time period.

As seen in FIG. 2B, the edge node 202 may comprise a processor(s) 240, a storage 242 for storing data and/or code (program store), a network interface 244 and optionally an Input/Output (I/O) interface 246 for connecting to one or more external and/or attachable devices.

The processor(s) 240, homogenous or heterogeneous, may include one or more processing nodes and/or cores arranged for parallel processing, as clusters and/or as one or more multi core processor(s). The processor(s) 240 may further, integrate, utilize and/or facilitate one or more hardware elements (modules) integrated and/or utilized in the edge node 202, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator and/or the like.

The storage 242 may include one or more non-transitory persistent storage devices, for example, a Read Only Memory (ROM), a Flash array, a Solid State Drive (SSD), a hard drive (HDD) and/or the like. The storage 242 may also include one or more volatile devices, for example, a Random Access Memory (RAM) component, a cache and/or the like. The storage 242 may further comprise one or more network storage devices, for example, a storage server, a Network Accessible Storage (NAS), a network drive, a database server and/or the like accessible through the network interface 244.

The network interface 244 may include one or more wired and/or wireless network interfaces for connecting to the network 204, for example, a LAN interface, a WLAN interface, a WAN interface, a MAN interface, a cellular interface and/or the like.

The I/O interface 246 may include one or more wired and/or wireless I/O interfaces, for example, a Universal Serial Bus (USB) port, a serial port, a Bluetooth (BT) interface, a Radio Frequency (RF) interface, an infrared (IR) interface, a Near Field (NF) interface and/or the like for communicating and/or attaching to one or more external devices and/or attachable devices, for example, a USB key dongle, a USB mass storage device, a wireless (e.g., RF, IR, NF, etc.) key and/or the like.

The edge node 202 may therefore communicate with the imaging sensors 208 over the network 204 via the network interface 244 204 and/or via the I/O interface 246.

The processor(s) 240 may execute one or more software modules such as, for example, a process, a script, an application, an agent, a utility, a tool, an Operating System (OS) and/or the like each comprising a plurality of program instructions stored in a non-transitory medium (program store) such as the storage 242 and executed by one or more processors such as the processor(s) 240.

The processor(s) 240 may therefore execute one or more functional modules implemented using one or more software modules, one or more of the hardware modules and/or combination thereof, for example, a classifier 250, a context based ML model 252, a data sampler 253, a visual tracker 254, a background generator 255, a scene monitor 256, and a historical data unit 257.

The remote server 206, for example, a server, a computing node, a cluster of computing nodes and/or the like may comprise a processor(s) 260 such as the processor(s) 240 for executing one or more functional modules, a storage 262 such as the storage 242 for storing data and/or code (program store) and a network interface 264 such as the network interface 244 for connecting to the network 204.

The processor(s) 260, homogenous or heterogeneous, may include one or more processing nodes and/or cores arranged for parallel processing, as clusters and/or as one or more multi core processor(s). The processor(s) 260 may further, integrate, utilize and/or facilitate one or more hardware elements (modules) integrated and/or utilized in the remote server 206, for example, a circuit, a component, an Integrated Circuit (IC), an ASIC, an FPGA, a DSP, a GPU, an AI accelerator and/or the like.

The processor(s) 260 may execute one or more software modules such as, for example, a process, a script, an application, an agent, a utility, a tool, an Operating System (OS) and/or the like each comprising a plurality of program instructions stored in a non-transitory medium (program store) such as the storage 262 and executed by one or more processors such as the processor(s) 260.

The processor(s) 260 may therefore execute one or more functional modules implemented using one or more software modules, one or more of the hardware modules and/or combination thereof, for example, one or more visual analysis tools 270, a depth data generator 272, a segmentation data generator 274, a classifier trainer 276, and a context based ML model trainer 278.

Optionally, the remote server 206, specifically the functional modules executed by the remote server 206 may be implemented as one or more cloud computing services, for example, an Infrastructure as a Service (IaaS), a Platform as a Service (PaaS), a Software as a Service (SaaS) and/or the like such as, for example, Amazon Web Service (AWS), Google Cloud, Microsoft Azure and/or the like.

Figure 3:
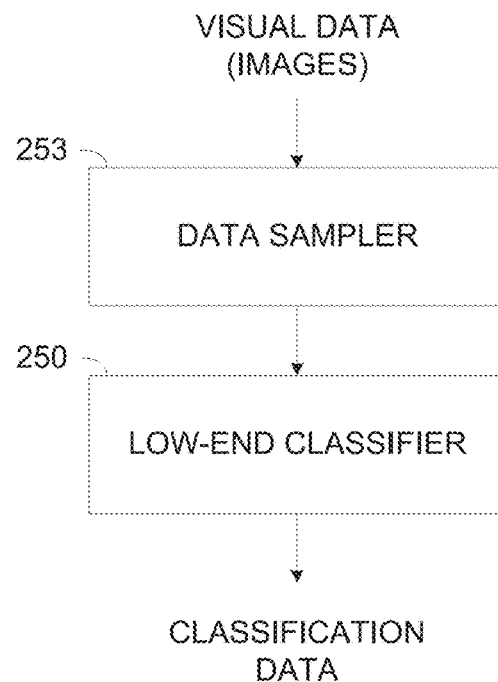
FIG. 3 is a schematic illustration of an exemplary flow of classifying objects and generating classification data accordingly for a certain scene using a low-end classifier, according to some embodiments of the present invention.

Reference is now made to FIG. 3, which is a schematic illustration of an exemplary flow of classifying objects and generating classification data accordingly for a certain scene using a low-end classifier, according to some embodiments of the present invention.

A low-end classifier such as the classifier 250 executed by an edge node such as the edge node 202, specifically by processor(s) such as the processor(s) 240 may be configured to analyze visual data, for example, one or more images of a scene such as the scene 210 captured by the imaging sensor(s) 208. The classifier 250 may generate classification data relating to one or more objects identified in the image(s) and classify them (label) them accordingly. The classification data may include data and/or metadata relating to each identified and classified object as known in the art, for example, a label, a bounding box in the image, a location in the image, a dimension (e.g. size, height, length, width, depth, etc.), a motion vector, an aspect ratio, a distance from the imaging sensor 208 which captured the image and/or the like.

The classifier 250 may be implemented using one or more methods, architectures and/or implementations as known in the art, for example, a neural network, a Support Vector Machine (SVM) and/or the like. In particular, since the edge node 202 may have limited computing resources, the classifier 250 may be configured and/or selected to be a low-end classifier utilizing limited (reduced) computing resources of the edge node 202, for example, reduced processing resources (processing power), reduced storage resources and/or the like.

However, in order to avoid missing potential anomaly events due to the limited performance low-end classifier 250, the classifier 250 may be configured for high false positive detection, for example, by reducing the threshold of the prediction score as known in the art. In other words, the classifier 250 may be configured for high recall at the expense of reduced accuracy and/or precision. As such, the classifier 250 may become highly 'noisy' since it may detect an increased number of false positive anomaly events but may avoid classifying true positive anomaly events as false negative events.

Optionally, the edge node 202, specifically the processor(s) 240 may execute a data sampler 253 configured and/or operated to manipulate one or more of the images of the scene 210 before feeding the images to the classifier 250. The manipulation of the images may include one or more operations, for example, down-sampling, cropping and/or the like. For example, the data sampler 253 may be operated to down sample, i.e. reduce resolution of one or more of the images of the scene 210 which may be high resolution images and output the lower resolution images for analysis and classification by the classifier 250. Analyzing reduced (lower) resolution images may require the classifier 250 to consume significantly reduced computing resources thus further reducing and/or limiting the computing resources allocated for the classifier 250. In another example, the data sampler 253 may be operated to crop one or more of the images of the scene 210 to extract one or more high resolution regions of interest from the images and output the cropped images to the classifier 250 for analysis and classification. Analyzing cropped images may enable the classifier 250 to analyze and classify high resolution visual data while limiting the computing resources required for the analysis since the classifier 250 may analyze only the region(s) of interest which may be high resolution but small in size.

Figure 4:
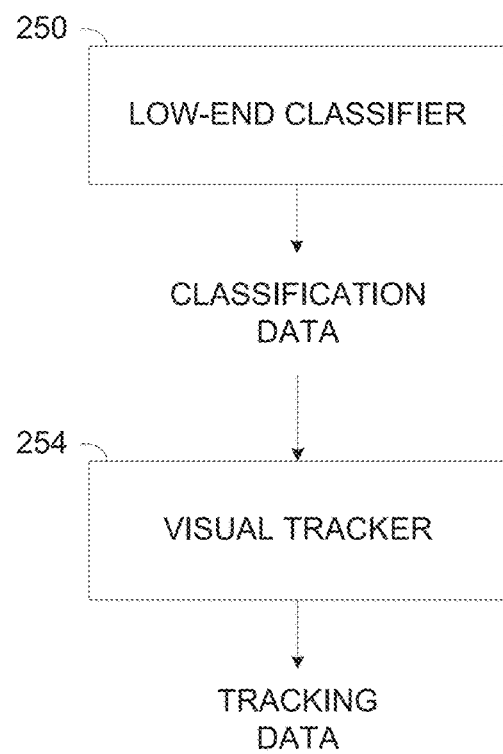
FIG. 4 is a schematic illustration of an exemplary flow of generating tracking data of dynamic objects detected in a certain scene, according to some embodiments of the present invention.

Reference is now made to FIG. 4, which is a schematic illustration of an exemplary flow of generating tracking data of dynamic objects detected in a certain scene, according to some embodiments of the present invention.

A visual tracker such as the visual tracker 254 executed at an edge node such as the edge node 202 by processor(s) such as the processor(s) 240 may be configured to analyze the classification data generated by a classifier such as the classifier 250 for a scene such as the scene 210 to generate tracking data comprising dynamic locations of one or more objects identified and tracked in a plurality of consecutive images of the scene 210. The tracking data generated by the visual tracker 254 may establish a temporal correlation between the consecutive images which may be used to track one or more of the object(s) detected in the consecutive images.

The term consecutive should not be interpreted narrowly as images immediately succeeding each other but rather images that follow each other either immediately and/or with serval images in between.

The visual tracker 254 may further identify one or more mobility patterns relating to dynamic location of one or more of the tracked objects. For example, assuming the classifier 250 identifies a certain dynamic object in a plurality of consecutive images depicting the scene 210. The classifier 250 may therefore generate classification data accordingly which maps the object identified by its label with dynamic locations in at least some of the consecutive images. Analyzing the classification data, the visual tracker 254 may identify one or more mobility patterns expressing the movement of the certain labeled object in the scene 210 as tracked in the at least some of the images.

Reference is made once again to FIG. 2C.

The one or more visual analysis tools 270 executed at the remote server 206 by the processor(s) 260, for example, a classifier, a neural network, an SVM, a computer vision analysis tool, an image processing algorithm and/or the like may be configured to analyze visual data. The visual analysis tool(s) 270 may analyze the visual data, for example, images, video sequences and/or the like extract data from the images (visual data) for one or more applications and/or uses, for example, classify one or more objects, actions, events, conditions, situations, states, scenarios and/or the like detected in the images. As such, the visual analysis tool(s) 270 may be applied to analyze one or more of the images captured by one or more of the imaging sensors 208 monitoring the scene 210 and/or part thereof in order to identify one or more objects in the scene 210, classify the identified object(s), identify anomaly events relating to the identified object(s), for example, presence of the object(s), one or more actions conducted by identified object(s) and/or the like.

In particular, since the remote server 206 may have extremely large and potentially unlimited computing resources, the visual analysis tool(s) 270 may be configured and/or selected to be a high-end analysis tool, for example, a high-performance classifier which may be capable to accurately and reliably identify and classify objects and events with very high success probability potentially at the expense of high computing resources consumption.

Moreover, the visual analysis tool(s) 270 and/or the classification data generated by the visual analysis tool(s) 270 may be used to generate historical classification data indicative of the classification of one or more objects, actions, events, conditions, situations, states, scenarios and/or the like typical, common and/or acceptable in the specific scene 210. The historical classification data may be later used as reference to support future classifications of the same and/or similar objects, actions, events, conditions, situations, states, scenarios and/or the like.

Figure 5:
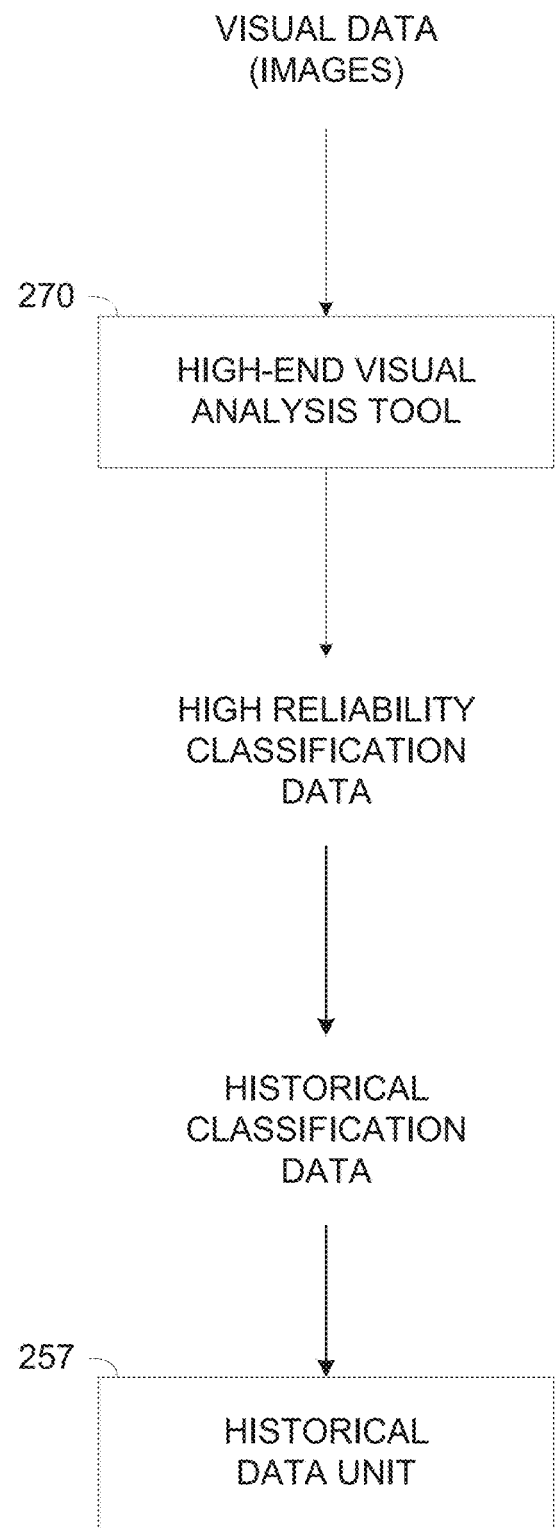
FIG. 5 is a schematic illustration of an exemplary flow of generating historical classification data for a certain scene, according to some embodiments of the present invention.

Reference is now made to FIG. 5, which is a schematic illustration of an exemplary flow of generating historical classification data for a certain scene, according to some embodiments of the present invention.

One or more visual analysis tools such as the visual analysis tool 270, for example, a high performance visual data classifier executed at a remote server such as the remote server 206 by processor(s) such as the processor(s) 260 may receive one or more images of a scene such as the scene 210 captured by one or more imaging sensors such as the imaging sensor 208. The visual analysis tool(s) 270 may classify one or more objects, actions, events, conditions, situations, states, scenarios and/or the like detected in the image(s) and may generate classification data accordingly, for example, a label, a dimension, a position, a motion vector, an aspect ratio, a distance from the imaging sensor 208 which captured the image and/or the like.

As described herein before, since the visual analysis tool(s) 270 is a high performance tool, for example, the high performance visual data classifier having major and practically unlimited computing resources, the visual analysis tool(s) 270 may produce highly reliable, accurate, consistent and/or robust classification data which accurately maps objects, actions, events, conditions, situations, states, scenarios and/or the like detected in the images(s).

As it is highly reliable, accurate, consistent and/or robust, the highly reliable classification data produced by the visual analysis tool(s) 270 and/or part thereof may be further used as historical classification data which may be used as reference to support future classifications of the same and/or similar objects, actions, events, conditions, situations, states, scenarios and/or the like.

The remote server 206 may then transmit the historical classification data and/or part thereof to the edge node 202, specifically to the historical data unit 257 which may store (cache) the historical classification data, for example, in the storage 242 for future use by the context based ML model 242 to derive one or more contextual attributes which may be associated with the scene 210.

The visual analysis tool(s) 270 may be further applied to generate and/or extract information form one or more images of the scene 210 for one or more applications. For example, the visual analysis tool(s) 270 may be applied to generate depth data for the scene 210, specifically for a background of the scene 210 which may comprise one or more substantially static objects which are usually and potentially always detected in the images of the scene 210 optionally at static locations. In another example, the visual analysis tool(s) 270 may be applied to generate segmentation data for scene 210, specifically for the background of the scene 210.

Figure 6:
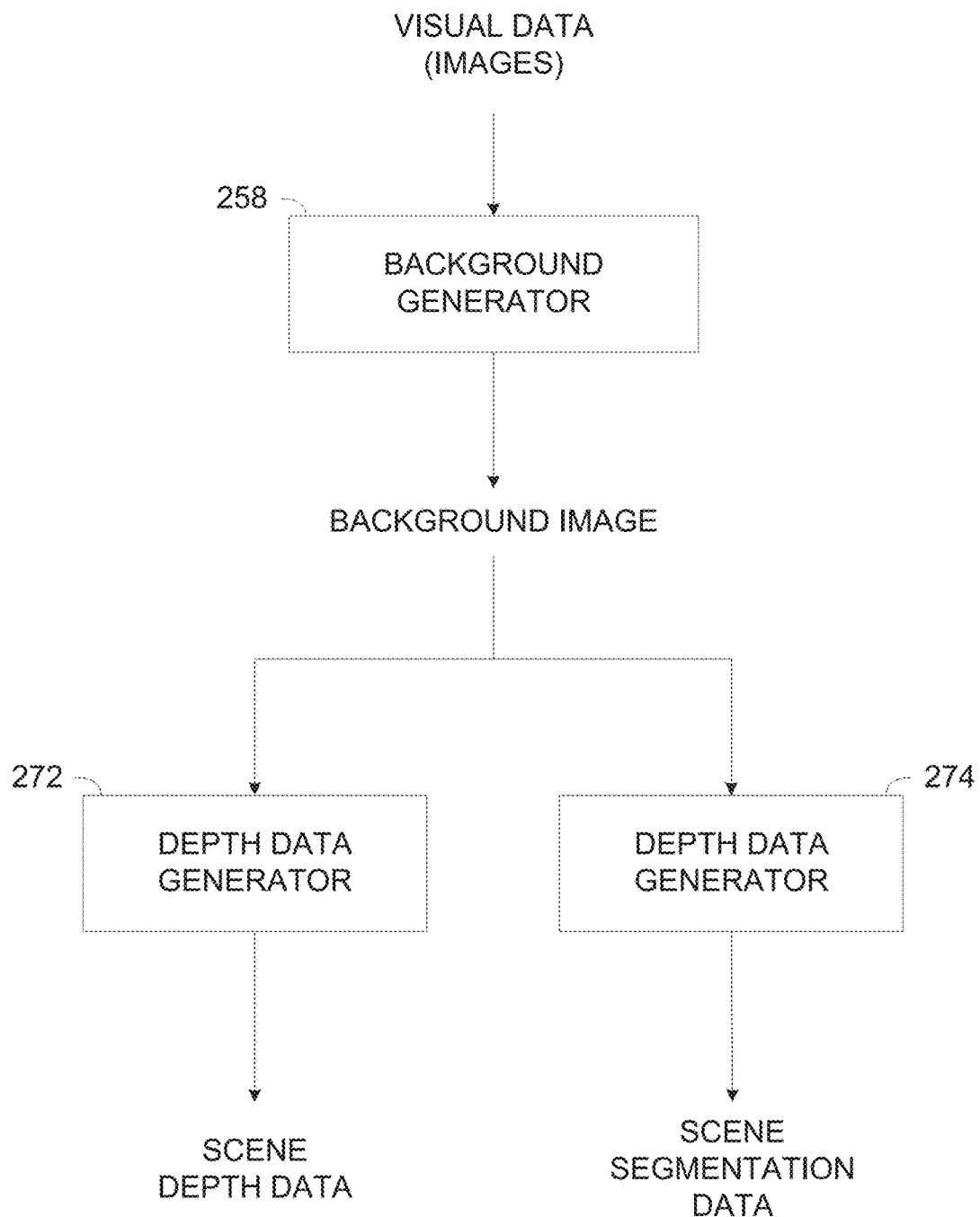
FIG. 6 is a schematic illustration of an exemplary flow of generating depth data and segmentation data for a certain scene, according to some embodiments of the present invention.

Reference is now made to FIG. 6, which is a schematic illustration of an exemplary flow of generating depth data and segmentation data for a certain scene, according to some embodiments of the present invention.

A background generator such as the background generator 255 executed at an edge node such as the edge node 202 by processor(s) such as the processor(s) 240 may be configured to generate one or more images of the background of the scene 210, in particular high quality background images. Each background image may comprise (show) objects which are substantially static in the scene 210 and are therefore always, generally and/or usually located and present in the scene 210. The background generator 255 may generate each background images based on a plurality of images of the scene 210, specifically a plurality of consecutive high quality images of the scene 210 captured by one or more of the imaging sensor(s) 208 deployed to monitor the scene 210.

The background generator 255 may analyze the plurality of consecutive high quality images which depict the scene 210 over a substantially long predefined time period (e.g. an hour, four hours, a day, a week, etc.). Based on the analysis, the background generator 255 may remove dynamic objects identified temporarily in the scene 210, i.e. in only part of the consecutive images, typically a small number of images thus leaving only the substantially static objects which are constantly or at least usually detected in the scene 210. For example, the background generator 255 may apply one or more background subtraction tools to at least some of the plurality of consecutive images to produce the high quality background image comprising only the substantially static objects while eliminating the dynamic objects.

For example, assuming a certain scene 210 relates to a certain industrial area comprising one or more static objects, for example, an office building, a warehouse, a plant, a gas station and/or the like. The certain industrial area may further comprise one or more road segments potentially including road signs, traffic lights, road markings and/or the like. One or more imaging sensors 208 deployed to monitor the certain scene 210 may therefore capture images depicting the static objects. However, occasionally, one or more dynamic objects may appear at the certain scene 210, for example, a vehicle (e.g. car, truck, motorcycle, bicycle, trained, etc.), a pedestrian, an animal (e.g. bird, cat, dog, etc.) and/or the like. The background generator 255 analyzing a plurality of images of the certain scene 210 captured over a prolonged period of time may be able to identify and distinguish the dynamic objects which appear in only few of the images from the substantially static objects appearing in most and typically all of the images.

In another example, assuming a certain scene 210 relates to a sea view monitored by one or more imaging sensors 208. The sea view may relate to a specific geographical location viewed from a static location, for example, a lighthouse, a beach and/or the like. However, the sea view may a more general sea view relating to a plurality of sea geographical locations viewed, for example, from a moving vessel, for example, a ship. While the general sea view may relate to a plurality of different geographical locations, all these locations may share highly common objects, for example, sea surface, waves, horizon and/or the like which may seem significantly the same in images captured by imaging sensor(s) 208 mounted in the vessel to monitor the sea. The captured images may therefore depict statically present objects such as, for example, the sea surface, the waves, the horizon and/or the like. However, occasionally, one or more dynamic objects may appear at the certain sea view scene 210, for example, a bird, a fish, a whale, another vessel, a piece of land, a land structure and/or the like. Analyzing a plurality of images of the sea view scene 210 captured over a prolonged period of time, the background generator 255 may be able to identify and distinguish the dynamic object(s) which appears in only few of the images from the substantially static object(s) appearing in most and typically all of the images and may produce the background image comprising only the substantially static objects.

The edge node 202 may transmit one or more of the background images to the remote server 206 which may analyze the background image(s) for one or more applications. For example, the remote server 206 may execute the depth data generator 272 to generate depth data for the scene 210. The depth data generator 272 may apply one or more of the visual analysis tools 270 to extract depth data relating to one or more objects identified in the background image, specifically substantially static objects. The depth data relating to a certain object may include, for example, a distance of the certain object from the view point, i.e., from the imaging sensor 208 which captured the image, one or more dimensions of the certain object (e.g. size, height, width, depth), a distance between objects, an elevation of the certain object with respect to ground surface and/or the like. In another example, the remote server 206 may execute the segmentation data generator 274 to generate segmentation data for the scene 210. The segmentation data generator 274 may apply one or more of the visual analysis tools 270 to perform segmentation of the background image as known in the art to segment the background image to a plurality of segments each comprising image portions sharing similar visual attributes, for example, color, texture, illumination and/or the like.

The scene monitor 256 may be configured to issue one or more requests to update the background image to reflect possible changes in the scene 210. The scene monitor 256 may be therefore configured to monitor the scene 210 by analyzing the visual data depicting the scene 210 and/or the classification data generated by the classifier 250 for the scene 210. In case, the scene monitor 256 determines that an updated background image is required, the scene monitor 256 may issue an update request. In response to the update request, the background generator 255 may generate an updated high quality image of the background of the scene 210 which may be transmitted to the remote server 206.

The scene monitor 256 may apply one or more operations modes for issuing the update request. For example, the scene monitor 256 may periodically issue an update request for creating and transmitting an updated background image, for example, every predefined time period, for example, every hour, every three hours, every eight hours, every day, every week and/or the like. In another example, the scene monitor 256 may issue one or more update requests in response to a request from the remote server 206.

However, creating the high quality scene background images may consume major processing resources of the edge node 202 which may be limited. Moreover, transmitting the high quality scene background images to the remote server may consume major networking resources, for example, bandwidth and/or the like. In addition, generating the depth data and/or the segmentation data may resource intensive at the remote server 206 which may induce performance impact, for example, latency, computing resources temporary unavailability and/or the like even for the remote server 206 having massive computing resources.

The scene monitor 256 may be therefore configured to limit the frequency of updating background images for the scene 210 by issuing update requests in response to one or more changes detected in the scene 210. Such change in the scene may include, for example, an environmental condition change, for example, change in illumination (light), precipitation (rain, snow, hail, etc.) start/stop and/or the like. In another example, the changes in the scene 210 may result from one or more objects moving out and/or moving into the scene, in particular objects which are not dynamic and may remain in the scene 210 for a significantly long time to be considered as part of the background of the scene 210. The change(s) to the scene 210 may also result from change of position, location, orientation and/or the like of the imaging sensor(s) 208 monitoring the scene 208. In another example, the background generator 255 may create and transmit an updated background image in response to a request from the remote server 206.

The scene monitor 256 may therefore issue update requests for updating the background image and generating updated depth and/or segmentation data accordingly at a frequency depending on how dynamic the scene 210 is, i.e. how often changes occur in the scene 210. Significantly static scenes 210 in which little changes take place may therefore typically require less updates of the background image compared to more dynamic scenes 210 in which changes may often and/or frequently occur thus requiring frequent updates of the background image.

The remote server 206 may transmit the depth data and/or the segmentation data generated for the scene 210 back to the edge node 202 which may store (cache) it for use to derive one or more contextual attributes which may be associated with the scene 210.

Figure 7:
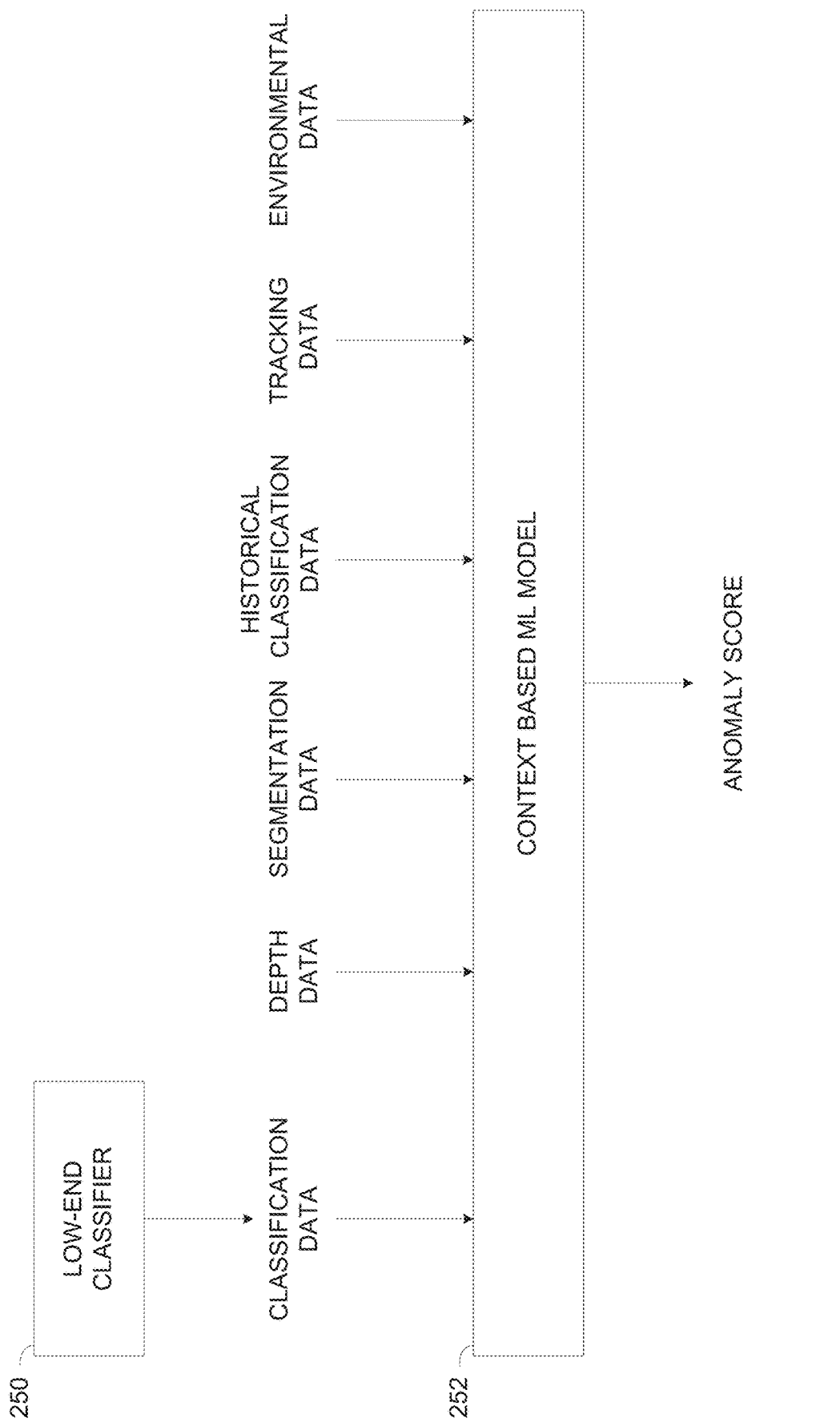
FIG. 7 is a schematic illustration of a context based ML model configured to compute an anomaly score for objects and events detected in a certain scene based on contextual attributes of the certain scene, according to some embodiments of the present invention.

Reference is now made to FIG. 7, which is a schematic illustration of a context based ML model configured to compute an anomaly score for objects and events detected in a certain scene based on contextual attributes of the certain scene, according to some embodiments of the present invention.

A context based ML model such as the context based ML model 252, for example, a neural network, a deep neural network, an SVM and/or the like executed at an edge node such as the edge node 202 by processor(s) such as the processor(s) 240 may be configured to analyze, evaluate and/or assess classification data generated by a classier such as the classifier 250. Based on the analysis of the classification data, the context based ML model 252 may compute an anomaly score for one or more potential anomaly events detected at the scene 210. Specifically, the context based ML model 252 may be applied to analyze the classification data generated by the classifier 250 and evaluate the potential anomaly event(s) based and/or with respect to one or more contextual attributes associated with the scene 210.

The context based ML model 252 may collect, receive, derive and/or compute a plurality of contextual attributes associated with the scene from a plurality of sources. For example, the context based ML model 252 may receive the depth data generated for the background of the scene 210 by one or more visual analysis tools such as the visual analysis tool 270 executed at the remote server 206 as described herein before. In another example, the context based ML model 252 may receive the segmentation data generated for the background of the scene 210 by the visual analysis tool(s) 270 as described herein before. In another example, the context based ML model 252 may receive the historical (classification) data generated for the scene 210 by the visual analysis tool(s) 270 as described herein before. In another example, the context based ML model 252 may use the tacking data generated for the visual tracker 254 as described herein before. In another example, the context based ML model 252 may receive environmental data, for example, illumination conditions (e.g. day, night, twilight, sunny, cloudy, foggy, moonlight, etc.), precipitation (e.g., rain, snow, hail, etc.) and/or the like from one or more resources, in particular online resources connected to the network 204, for example, a weather service, a weather forecast service, a moonlight service, a sunrise/sunset service and/or the like.

Reference in made once again to FIG. 1.

The process 100 is described for a single edge node 202 deployed at the edge of the network 204 to extract visual data from a single scene 210 relating to a single (physical) area which communicates with single remote server 206 configured to further process scene 210 to identify anomaly events. This, however, should not be construed as limiting since the process 100 may be expanded for a plurality of edge nodes 202 deployed at the edges of the network 204 to extract visual data from a plurality of scenes 210 relating to a plurality of (physical) areas and communicate with one or more remote servers 206 configured to further processing the plurality of scenes 210.

As shown at 102, the process 100 starts with the edge node 202 receiving visual data, for example, a plurality of images of the scene 210 captured by one or more of the imaging sensors 208 deployed to monitor the scene 210, specifically the area the at the scene 210 relates to.

The received images of the scene 210 may typically be high quality images at high resolution (e.g. High Definition, 4K, 8K. 16K, etc.) to support detection of fine details in the scene 210.

As shown at 104, the edge node 202 may apply the classifier 250 executed by the processor(s) 240 to one or more of the received images to generate classification data for the scene 210, for example, metadata relating to one or more objects, actions, events, conditions, situations, states, scenarios and/or the like detected in the images, for example, a label, a bounding box in the image, a location in the image, a dimension (e.g. size, height, length, width, depth, etc.), a motion vector, an aspect ratio, a distance from the imaging sensor 208 which captured the image and/or the like.

Optionally, prior to applying the classifier 250 to the images which may be high resolution, the data sampler 253 may be first applied to down sample, i.e. reduce the resolution of one or more of the images in order to reduce the computing resources required by the classifier 250 to process the images.

As shown at 106, the edge node 202 may set a certain flag, for example, an iteration_flag (iteration_flag=1) to define provisions for limiting a number of iterations of the process 100 for detecting anomaly event(s) in the image processed by the classifier 250. This provision is explained in further detail herein after.

As shown at 108, the edge node 202 may apply the context based ML model 252 executed by the processor(s) 240 to process, for example, analyze, evaluate and/or assess the classification data generated by the classifier 250 in order to compute an anomaly score for one or more potential anomaly evets detected in the images depicting the scene 210.

A plurality of scenes 210 each relating (e.g. showing, portraying, etc.) a different area and/or a different area type may be each characterized and/or associated with one or more contextual attributes which may change from one scene 210 to another, for example, a type of the area, object(s) located in the area, dimensions of the objects (e.g. size, height, length, width, depth, aspect ratio, etc.), position and/or location of the objects in the area, event(s) occurring in the area, conditions of the area (e.g. lighting conditions, environmental conditions, etc.) and/or the like. As such, objects, actions, events, conditions, situations, states, scenarios and/or the like which may be typical, possible and/or acceptable in each scene 210 may not be such in another scene 210.

Moreover, the contextual attributes of one or more scenes 210 may change over time. For example, objects which may be present in the scene 10 during one or more time periods may not be in the scene 210 at other times. In another example, environmental conditions may change over time, for example, lighting conditions may change over time (e.g. night and day), weather conditions (e.g. rain, snow, clouds, etc.) and/or the like.

The context based ML model 252 may therefore use the contextual data collected for the scene 210, for example, the depth data, the segmentation data, the historical classification data, the tracking data and/or the environmental data to extract, derive and/or compute one or more of the contextual attributes typical to the scene 210. The context based ML model 252 may then train, adjust and learn based on the contextual attributes associated with the scene 210.

Using the context based ML model 252 to compute the anomaly score for the potential anomaly event(s) based on the contextual attributes associated with the scene 210 may significantly improve the accuracy, reliability, consistency and/or robustness of the computed anomaly score.

Using the trained and learned context based ML model 252 may be of particular benefit due to the fact that the classification data is generated by the low-end classifier 250 having only limited computing resources which may generate reduced quality classification data, for example, reduced accuracy, reduced reliability, reduced consistency and/or limited robustness, for example, incorrect labeling of objects and/or actions, incorrect dimension, distance and/or elevation estimation, incorrect positioning of objects and/or the like.

Moreover, since the classifier 250 is configured for high false positive detection in order to avoid missing true positive detections, the quality of the classification data generated by the classifier 250 may be further reduced. Applying the trained and learned context based ML model 252 may therefore filter out such false positive detections and/or compute a significantly improved anomaly score for one or more of the potential anomaly events detected by the classifier 250 in the scene 210, for example, higher accuracy, higher reliability, higher consistency and/or increased robustness.

For example, based on the depth data generated for the background of the scene 210 by the visual analysis tool(s) 270 as described herein before, the context based ML model 252 may compute one or more contextual attributes of the scene 210. For example, based on the depth data, the context based ML model 252 may derive and/or compute one or more dimensions (e.g. size, height, length, width, depth) of one or more objects detected in the scene 210 and classified by the classifier 250. In another example, the based on the depth data, the context based ML model 252 may map the location and/or position of one or more objects detected in the scene 210, for example, a distance of one or more objects detected in the scene 210 from the imaging sensor(s) 208 which captured the image, a distance between objects, an elevation of one or more of the detected objects with respect to ground surface and/or the like. In another example, the based on the depth data, the context based ML model 252 may compute an aspect ratio of one or more objects detected in the scene 210, for example, based on the dimensions of one or more other objects, specifically background objects, based on the distance from the imaging sensor(s) 208 and/or the like.

Figure 8:
FIG. 8 presents images of a scene analyzed to detect objects and/or events based on size contextual attributes of the scene extracted from depth data of the scene, according to some embodiments of the present invention.

Reference is now made to FIG. 8, which presents images of a scene analyzed to detect objects and/or events based on size contextual attributes of the scene extracted from depth data of the scene, according to some embodiments of the present invention. A classifier such as the classifier 250 operated to generate classification data for a certain scene 210A such as the scene 210 may classify a certain object 802 as a car and may generate classification data accordingly, for example, a label, a bounding box and/or the like.

However, a context based ML model such as the context based ML model 252 analyzing the classification data generated by the classifier 250 may determine that, based on the size of the object 802 which may be computed based on the depth data generated for the scene 210A, the object 802 may be too small to be a car and may compute a reduced score, for example, a reduced anomaly score accordingly for the presence of the car in the scene 210A.

Figure 9:
FIG. 9 presents images of a scene analyzed to detect objects and/or events based on aspect ratio contextual attributes of the scene extracted from depth data of the scene, according to some embodiments of the present invention.
Figure 9:

Reference is now made to FIG. 9, which presents images of a scene analyzed to detect objects and/or events based on aspect ratio contextual attributes of the scene extracted from depth data of the scene, according to some embodiments of the present invention. A classifier such as the classifier 250 operated to generate classification data for a certain scene 210B such as the scene 210 may classify a certain object 904 as a person and may generate classification data accordingly, for example, a label, a bounding box and/or the like.

A context based ML model such as the context based ML model 252 may receive depth data generated by one or more visual analysis tools such as the visual analysis tool 270 and may compute, based on the depth data, dimensions of one or more background objects detected in the scene 210B, for example, an object 902 classified as a forklift by the visual analysis tool(s) 270.

Analyzing the classification data generated by the classifier 250, the context based ML model 252 may compute an aspect ratio of the object 904 detected by the classifier 250 compared to the known forklift object 902. The context based ML model 252 may estimate and/or determine that based on the computed aspect ratio, the object 904 may be a human with high probability. The context based ML model 252 may therefore compute an increased score, for example, an increased anomaly score accordingly for the detected object 904.

In another example, based on the segmentation data generated for the background of the scene 210 by the visual analysis tool(s) 270 as described herein before, the context based ML model 252 may accurately identify one or more background objects which are typically, usually and/or permanently located in the area portrayed in the scene 210 and are thus defined as contextual attributes associated with the scene 210. For example, assuming a tree is located and detected in a certain scene 210, the background segmentation data may map this tree. Further assuming that the classifier 250 generated classification data indicative of a pole located at the exact location of the tree. In such case, based on the segmentation data, the context based ML model 252 may determine that the classifier 250 incorrectly classified the tree as a pole.

Moreover, using the segmentation data, the context based ML model 252 may accurately distinguish between one or more of the background objects and other objects detected in the scene 210 by the classifier 250. For example, assuming a certain scene 210 relates to a certain area comprising large surfaces, for example, walls, roads, boardwalks and/or the like. Further assuming that the classifier 250 generated classification data indicative of a pedestrian walking in a location mapped to sidewalk. In such case, based on the segmentation data, the context based ML model 252 may determine that the classifier 250 correctly classified the pedestrian since he is detected walking on a sidewalk. In contrast, assuming that the classifier 250 generated classification data indicative that the pedestrian is walking in a location mapped to wall, based on the segmentation data, the context based ML model 252 may determine that the classifier 250 incorrectly classified the pedestrian since it may be impossible to walk on walls.

Figure 10:
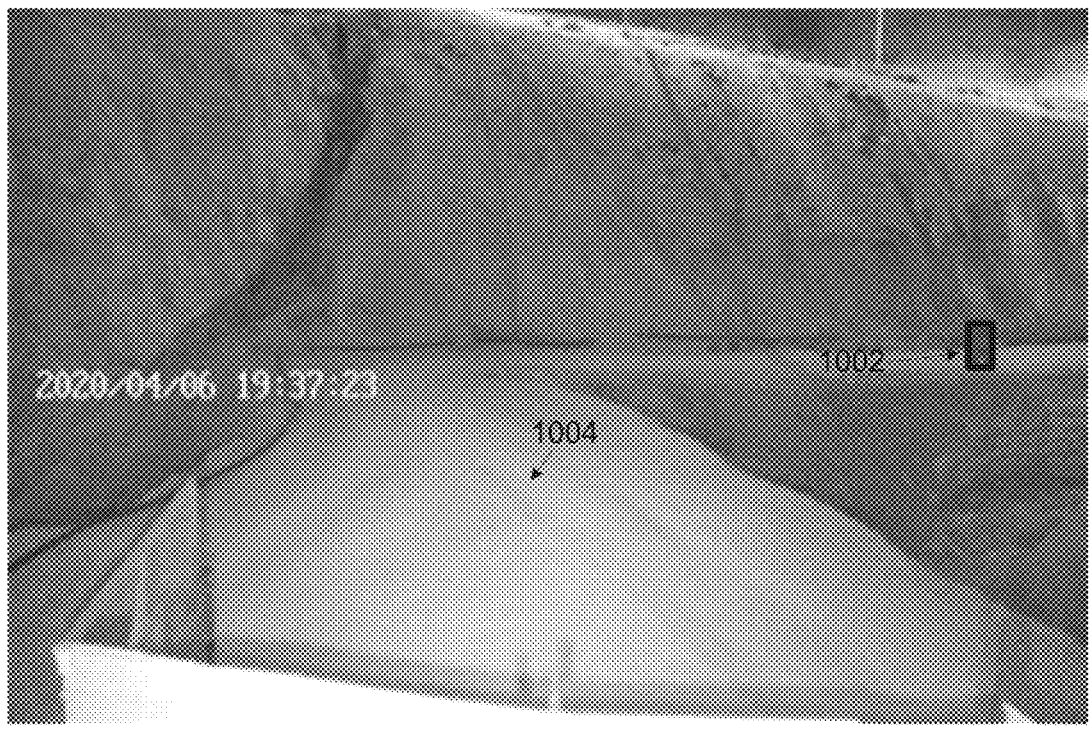
FIG. 10 is an image of a scene analyzed to detect objects and/or events based on position contextual attributes of the scene extracted from segmentation data of the scene, according to some embodiments of the present invention.

Reference is now made to FIG. 10, which is an image of a scene analyzed to detect objects and/or events based on position contextual attributes of the scene extracted from segmentation data of the scene, according to some embodiments of the present invention. A classifier such as the classifier 250 operated to generate classification data for a certain scene 210C such as the scene 210 may classify a certain object 1002 as a person and may generate classification data accordingly, for example, a label, a bounding box and/or the like.

A context based ML model such as the context based ML model 252 may receive segmentation data generated by one or more visual analysis tools such as the visual analysis tool 270 and may identify, based on the segmentation data, a trail or a road object 1004. Analyzing the classification data generated by the classifier 250, the context based ML model 252 may map the position of the object 1002 detected by the classifier 250 to be on the trail 1004. The context based ML model 252 may therefore estimate and/or determine that the detection and classification of the object 1002 by the classifier 250 is correct and may compute an increased score, for example, an increased anomaly score accordingly.

In another example, the context based ML model 252 may use the historical classification data generated for the scene 210 by the visual analysis tool(s) 270, for example, the high-performance classifier which comprises high-reliability classification data as described herein before. In particular, the historical classification data, locally available from the historical data unit 257, may describe, indicate and/or otherwise relate to one or more objects, actions, events, conditions, situations, states, scenarios and/or the like which are typical common, frequent and/or the like at the scene 210 and may be thus considered acceptable and/or allowed at the scene 210. Using, as reference historical contextual attributes associated with the scene 206 which are extracted from the historical classification data, the context based ML model 252 may detect objects, actions, events, conditions, situations, states, scenarios and/or the like which deviate from the reference and are thus potential anomaly events. The context based ML model 252 may therefore compute and/or adjust the anomaly score of one or more potential anomaly events detected by the classifier 250 based on one or more of the contextual historical attributes associated with the scene 206.

For example, assuming a first scene 210 relates to an urban area in which a plurality of dynamic objects, for example, vehicles, pedestrians and/or the like may be present. A context based ML model 252 associated with the first scene 210 may therefore train, adjust and learn to these contextual attributes, i.e., the vehicles and pedestrians which are typical to and hence associated with the first scene 210. In contrast, a second scene 210 relates to an isolated facility which may be accessed only by vehicles, in particular authorized vehicles such that a context based ML model 252 associated with the second scene 210 may train, adjust and learn these contextual attributes, i.e., only authorized vehicles are typical to and hence associated with the second scene 210. Further assuming a classifier 250 associated with the scene 210 generates classification data indicative of a pedestrian detected in the first scene 210. In such case, based on the historical classification data collected for the first scene 210, the context based ML model 252 of the first scene 210 may determine with high probability that this event is not an anomaly since it is highly likely that pedestrians are present in the first scene 210 and may compute a reduced anomaly score accordingly. However, in case a classifier 250 associated with the second scene 210 generates similar classification data indicative of a pedestrian detected in the second scene 210, based on the historical classification data collected for the second scene 210, the context based ML model 252 of the second scene may determine with high probability that this event is indeed an anomaly since pedestrians are not allowed to enter the second scene 210 and may compute an increased anomaly score accordingly.

In another example, assuming a first scene 210 relates to a sport area in which a plurality of people may engage in one or more sports, for example, soccer, basketball and/or the like and may come to physical interaction. A context based ML model 252 associated with the first scene 210 may therefore train, adjust and learn to these contextual attributes, i.e., the physical interaction that is typical and/acceptable for the first scene 210 and is hence associated with the first scene 210. A second scene 210 however, may relate to an urban area, for example, a street in which people may be present, standing, sitting, walking, strolling, running and/or the like. A context based ML model 252 associated with the second scene 210 may therefore train, adjust and learn these contextual attributes, i.e., typical actions of people in the street which are thus associated with the second scene 210. Further assuming a classifier 250 associated with the first scene 210 generates classification data indicative of a physical contact and/or physical interaction detected between people in the first scene 210. In such case, based on the historical classification data collected for the first scene 210, the context based ML model 252 of the first scene 210 may determine with high probability that this event is not an anomaly since it is highly likely that people playing some sport may touch and/or interact with each other and may compute a reduced anomaly score accordingly. However, this may be very different in case a classifier 250 assigned to the second scene 210 generates classification data indicative of a physical interaction between people detected in the second scene 210. In such case, based on the historical classification data collected for the second scene 210, the context based ML model 252 of the second scene 210 may determine with high probability that this event is indeed an anomaly indicative of a potential violent event since people are not supposed to engage in physical interaction in the second scene 210 and may compute an increased anomaly score accordingly.

Figure 11:
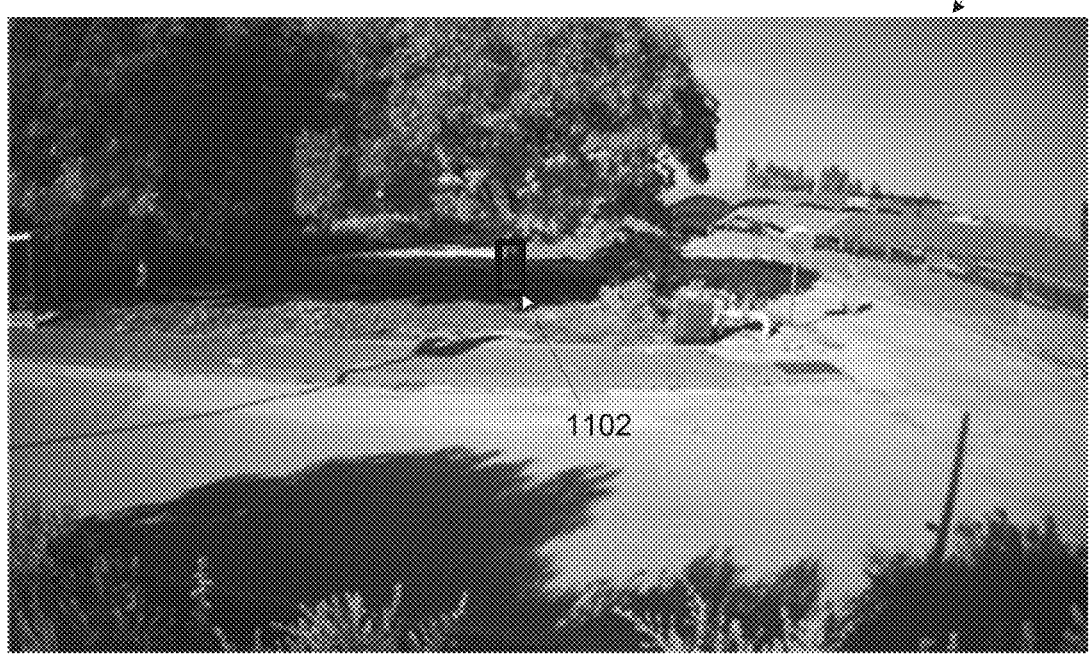
FIG. 11 is an image of a scene analyzed to detect objects and/or events based on contextual attributes learned for the scene based on historical classification data, according to some embodiments of the present invention.

Reference is now made to FIG. 11, which is an image of a scene analyzed to detect objects and/or events based on contextual attributes learned for the scene based on historical classification data, according to some embodiments of the present invention.

A classifier such as the classifier 250 operated to generate classification data for a certain scene 210D such as the scene 210 may classify a certain object 1102 as a person and may generate classification data accordingly, for example, a label, a bounding box and/or the like. The classification data generated by the classifier 250 may be analyzed by a context based ML model such as the context based ML model 252 associated with the scene 210E which is trained and/or adjusted to identify one or more contextual attributes of the scene 210D learned based on historical classification data generated by one or more visual analysis tools such as the visual analysis tool 270.

In such case, the trained context based ML model 252 may determine that the object 1002 is in fact a tree detected in the scene 210D in the past and classified accordingly by the visual analysis tool 270, for example, the high-performance classifier. The context based ML model 252 may therefore estimate and/or determine that the detection and classification of the object 1102 by the classifier 250 may be incorrect and may compute a reduced score, for example, a reduced anomaly score accordingly.

In another example, the context based ML model 252 may use tracking data generated for the visual tracker 254 as described herein before. Based on the tracking data, the context based ML model 252 may determine and/or estimate the classification data generated by the classifier 250 based on one or more images of the scene with respect to classification data generated by the classifier 250 for one or more previous images. In particular, the context based ML model 252 may determine whether the classification data generated by the classifier 250 is correct for one or more mobile objects detected in the scene 210 which dynamically change their location. Moreover, based on the tracking data, specifically based on one or more mobility pattern identified by the visual tracker for one or more mobile, objects detected in the scene, the context based ML model 252 may determine whether the one or more mobile objects identified in the scene 210 and labeled accordingly by the classifier 250 follow the mobility pattern(s) received from the visual tracker 254.

Figure 12A:
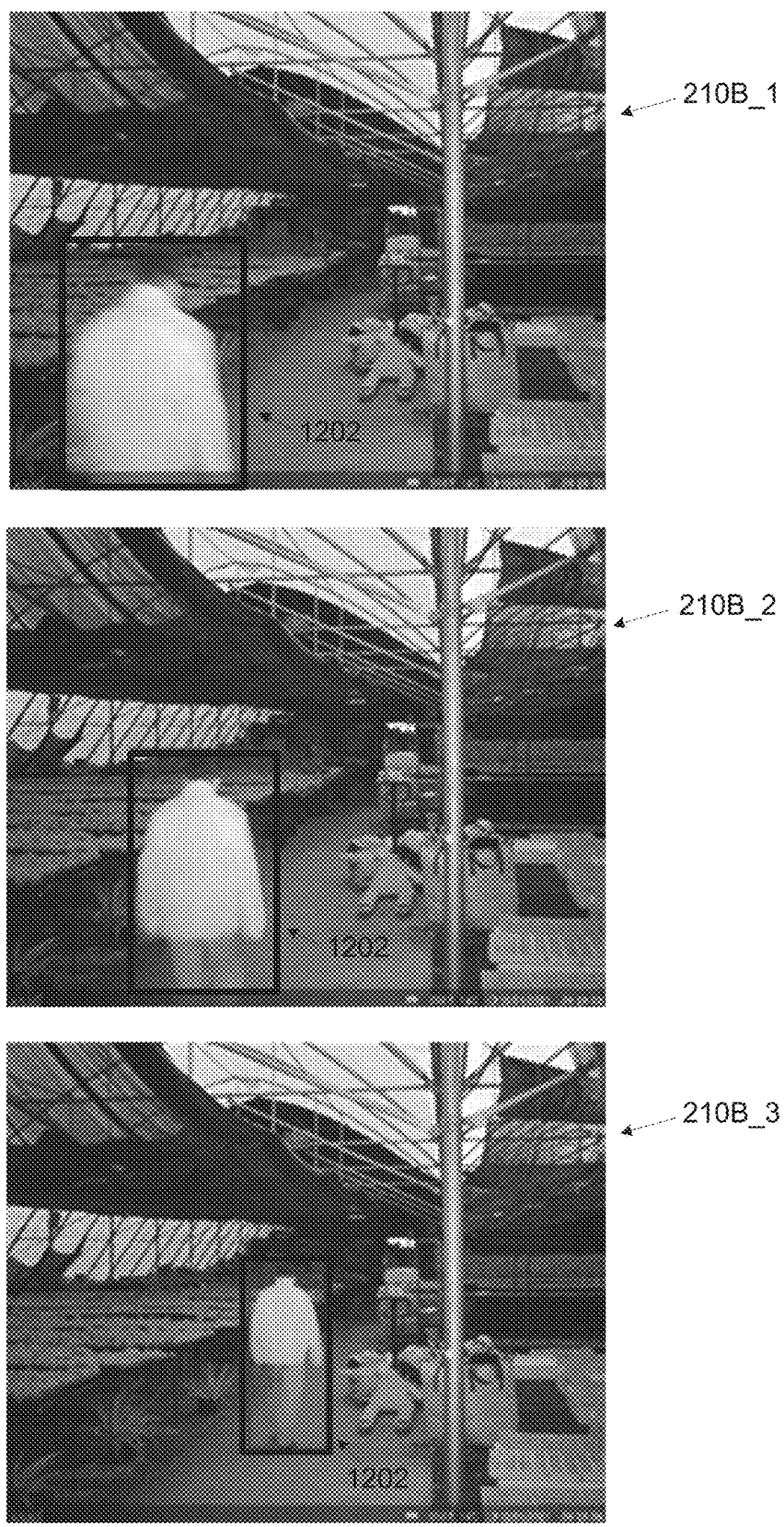
FIG. 12A and FIG. 12B are image scenes analyzed to detect objects and/or events based on tracking contextual attributes of the scene extracted from tracking data generated for the scene, according to some embodiments of the present invention; and Reference is now made to FIG. 13, is an image of a scene analyzed to detect objects and/or events based on contextual attributes learned from historical classification data coupled with environmental contextual attributes, according to some embodiments of the present invention.
Figure 12B:
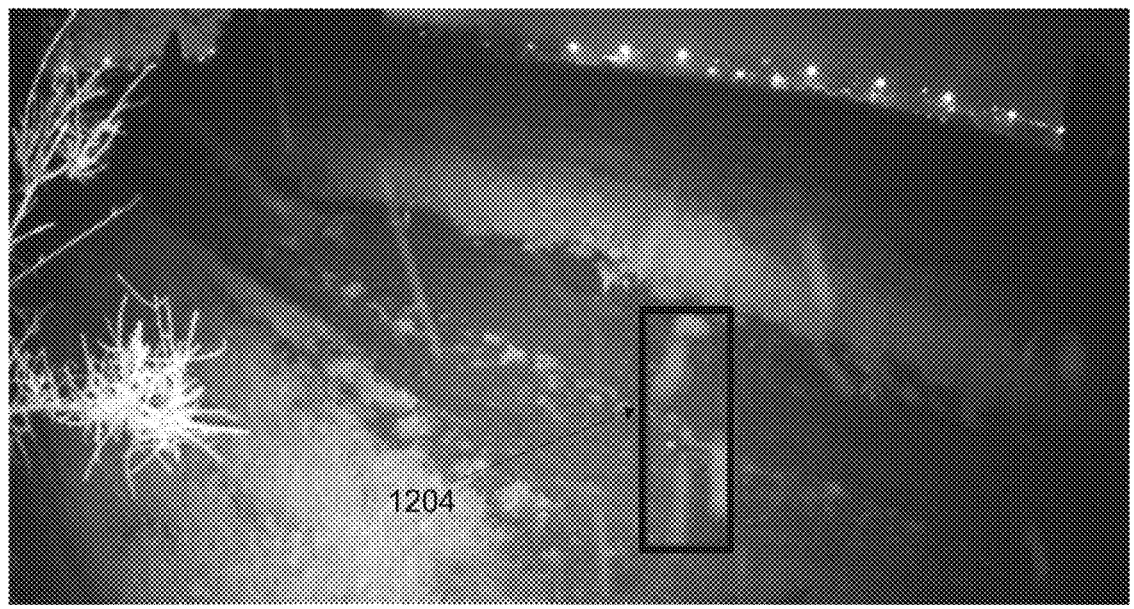
Figure 12B:

Reference is now made to FIG. 12A and FIG. 12B, which are image scenes analyzed to detect objects and/or events based on tracking contextual attributes of the scene extracted from tracking data generated for the scene, according to some embodiments of the present invention.

As seen in FIG. 12A, a classifier such as the classifier 250 operated to generate classification data for a certain scene 210B such as the scene 210 may classify a certain object 1202 as a person and may generate classification data accordingly, for example, a label, a bounding box and/or the like.

A context based ML model such as the context based ML model 252 associated with the scene 210D may receive tracking data generated, for example, by a visual tracker such as the visual tracker 254 which comprises dynamic locations of one or more objects, for example, the person 1202 in a plurality of consecutive images of the certain scene 210B, for example, images 210B_1 and 210B_2. Assuming the classifier 250 generates classification data generated based on a current image 210B_3 indicative of the person 1202 at a new location. Based on the tracking data, the context based ML model 252 may determine and/or estimate that the classification data generated by the classifier 250 is correct since the person 1202 was present in one or more preceding images and may compute an increased score, for example, an increased anomaly score accordingly.

Moreover, the context based ML model 252 may compute the anomaly score based on the location of the person 1202 indicated in the classification data. For example, in case the current location of the person 1202 indicated by the classifier 250 is possible or feasible with high probability compared to the previous location(s), for example, movement of 3 meters in 5 seconds, the context based ML model 252 may determine that it is highly likely for the person 1202 to move in such way and may compute a reduced anomaly score accordingly. However, in case, the in case the current location of the person 1202 indicated by the classifier 250 is highly unlikely compared to the previous location(s), for example, movement of 50 meters in 2 seconds, the context based ML model 252 may determine that it is highly improbable for the person 1202 to move in such speed and may compute an increased anomaly score accordingly.

As seen in FIG. 12B, a classifier such as the classifier 250 operated to generate classification data for a certain scene 210B such as the scene 210 may detect and classify one or more objects in the scene 210D and may generate classification data accordingly, for example, a label, a bounding box and/or the like.

A context based ML model associated with the scene 210D may receive tracking data generated, for example, by the visual tracker 254 which comprises dynamic locations of one or more objects, for example, a person 1204 detected in a previous image of the certain scene 210D, for example, an image 210D_1. Assuming the classifier 250 generates classification data generated based on a current image 210B_2 taken a short time after image 210D_1 (e.g. 1 second) indicating that no person is detected in the scene 210D. The context based ML model 252 analyzing the tracking data compared to the current classification data may determine and/or estimate that the classification data generated by the classifier 250 for the previous image 210D_1 may be incorrect since the person 1204 is no longer detected in the scene. The context based ML model 252 therefore compute and/or adjust the anomaly score previously computed for this potential anomaly event, for example, reduce the score.

Based on the analysis of the classification data, the context based ML model 252 may compute an anomaly score for one or more potential anomaly events detected at the scene 210. Specifically, the context based ML model 252 may be applied to analyze the classification data generated by the classifier 250 and evaluate the potential anomaly event(s) based on one or more contextual attributes associated with the scene 210.

Obviously, the context based ML model 252 may combine a plurality of contextual attributes associated with the scene 210 to compute the anomaly score for one or more of the potential anomaly events detected by the classifier 250. For example, the context based ML model 252 may compute the anomaly score for one or more potential anomaly events based on analysis of the classification data generated by the classifier 250 with respect to size and position contextual attributes associated with the scene 210. In another example, the context based ML model 252 may compute the anomaly score for one or more potential anomaly events based on analysis of the classification data generated by the classifier 250 with respect to tracking data combined with historical classification data.

Figure 13:
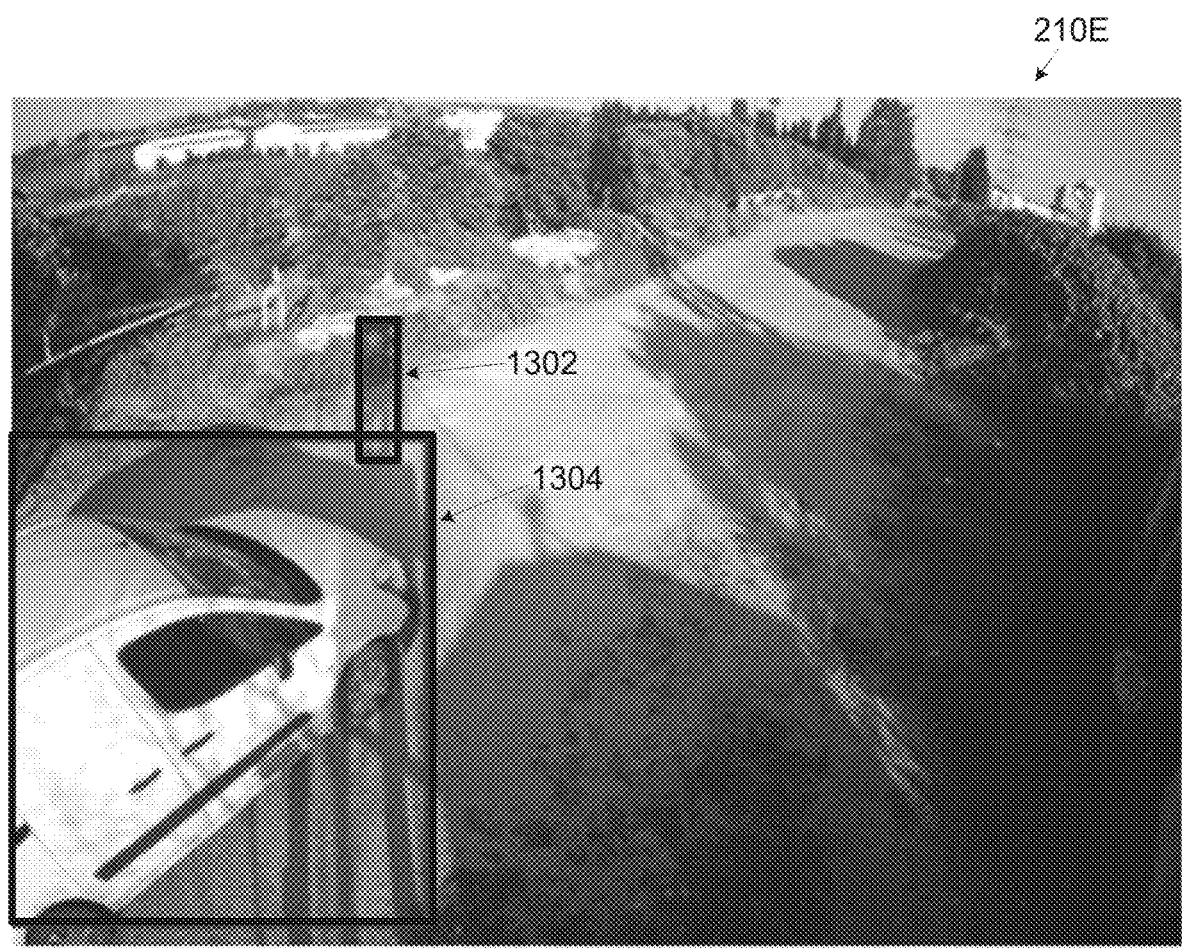

Reference is now made to FIG. 13, which is an image of a scene analyzed to detect objects and/or events based on contextual attributes learned from historical classification data coupled with environmental contextual attributes, according to some embodiments of the present invention.

A classifier such as the classifier 250 may be operated to analyze visual data, for example, one or more images of a scene 210E such as the scene 210 and generate classification data accordingly for one or more detected objects, for example, a label, a bounding box and/or the like. The classification data generated by the classifier 250 may be analyzed by a context based ML model such as the context based ML model 252 associated with the scene 210E which is trained and/or adjusted to identify one or more contextual attributes of the scene 210E learned based on historical classification data generated by one or more visual analysis tools such as the visual analysis tool 270.

The context based ML model 252 may further receive one or more environmental contextual attributes relating to the scene 210E, for example, a time of day, an illumination level, a visibility and/or the like.

Assuming the classifier 250 associated with the scene 210 generates classification data indicative of a person (object) 1302 detected in the scene 210E. The trained context based ML model 252 may however may determine, based on one or more contextual attributes associated with the scene 210E that at the current time of day a certain object may cast a shadow at the exact location in which the person 1302 is detected by the classifier 250. The context based ML model 252 may derive these contextual attributes of the scene 250 from historical classification data mapping the shadow to the specific location at a certain time of day. The context based ML model 252 may therefore estimate and/or determine that the detection and classification of the object 1102 by the classifier 250 may be incorrect and may compute a reduced anomaly score accordingly.

Reference in made once again to FIG. 1.

As shown at 110, which is a conditional step, in case the anomaly score computed by the context based ML model 252 exceeds a certain threshold, specifically a first threshold, for example, 0.8, 0.85, 0.9 and/or the like (in a range of 0 to 1), meaning the context based ML model 252 determines and/or estimates with high probability that the potential the anomaly event(s) detected by the classifier 250 based on the current image is real, the process 100 may branch to 112. However, in case the anomaly score does not exceed the first threshold, the process may branch to 114.

As shown at 112, since the context based ML model 252 determines there is a high probability that the potential anomaly event(s) detected by the classifier 250 in the currently processed image is real, the edge node 202 may transmit the current image in which the anomaly event(s) was detected to the remote server 206.

The remote server 206 may apply one or more of the visual analysis tools 270 as described herein before to further analyze the received image(s) in order to determine and/or estimate whether the potential anomaly events detected by the classifier 250 are real or not. Since, as described herein before, the remote server 206 having extensive computing resources may apply high-end analysis tool(s) 270, for example, the high-performance classifier which may accurately and reliably identify and classify objects and events with very high success probability and thus be able to successfully and correctly detect and classify the potential anomaly event.

As shown at 114, which is another conditional step, in case the iteration_flag=1 the process 100 may branch to 116 and may optionally enter another iteration of processing the current image to identify potential anomaly event(s). In particular, the additional iteration may be done using a higher quality and/or higher focus version of the currently processed image. However, in order to limit the iterations of the process 100 to a single additional iteration, in case the iteration_flag=0, meaning that an additional iteration was already done, the process 100 may branch to 118.

As shown at 116, which is another conditional step, in case the anomaly score computed by the context based ML model 252 does not exceed a certain threshold, specifically a second threshold, for example, 0.65, 0.7, 0.75 and/or the like (in a range of 0 to 1) the process 100 may branch to 118.

However, in case the anomaly score exceeds the second threshold, the process 100 may branch to 120 and initiate an additional iteration of processing the current image. An anomaly score in the range between the first and second thresholds may indicate that the context based ML model 252 may be inconclusive as to whether the potential anomaly event detected by the classifier 250 is real or not. The context based ML model 252 may therefore instruct initiating another iteration of processing the current image, specifically applying a "selective focus" to crop one or more of the images in which the potential anomaly event(s) is detected and apply the classifier 250 to the cropped image(s).

In particular, the classifier 250 may be applied to high quality, for example, high-resolution cropped image(s) in which one or more of the objects, actions, events, conditions, situations, states, scenarios and/or the like detected in the images may be detected with higher probability, accuracy, reliability and/or consistency.

As shown at 118, since the context based ML model 252 determines there is low probability that the potential anomaly event detected by the classifier 250 is real, meaning that the context based ML model 252 estimates that the classification data generated by the classifier 250 based on a current image is probably incorrect with respect to the detected anomaly event(s), the current image may be discarded.

As shown at 120, since the context based ML model 252 is inconclusive as to whether the potential anomaly event detected by the classifier 250 is real or not, the context based ML model 252 may instruct selective focus in one or more sections and/or portions of one or more of the image(s) depicting the scene 210 and/or part thereof.

The image(s) may be cropped by the data sampler 253 which may be applied to one or more of the images captured by the imaging sensor(s) 208 which depict the scene 210. In particular, the data sampler 253 may crop the high quality image(s) received from the imaging sensor(s) 208 rather than the down-sampled image(s) in order to enable the classifier 250 to accurately detect and/or classify objects, actions, events, conditions, situations, states, scenarios and/or the like depicted in the image(s).

As shown at 122, the edge node 202 may apply the classifier 250 to the cropped high quality image(s) in order to further analyze it in attempt to better detect one or more objects, actions, events, conditions, situations, states, scenarios and/or the like and generate improved classification data accordingly.

As shown at 124, the edge node 202 may clear the iteration_flag (iteration_flag=0) such that the next time step 114 is reached for the currently processed image, the process 100 branches to 118 thus ensuring that only a single additional iteration of the process 100 is conducted for the currently processed image.

The edge node 202 may then apply the context based ML model 252 to the classification data generated by the classifier 250 for the cropped high quality image(s) in order to compute a more accurate anomaly score for one or more anomaly events detected by the classifier 250 in the scene 210.

A stated herein before, the remote server 206 may further execute the classifier trainer 276 and the context based ML model trainer 278.

The classifier trainer 276 may be configured to train one or more of the classifiers applied to detect and classify the anomaly events, for example, the low-end classifier 250 and/or one or more of the high-end visual analysis tools 270. The classifier trainer 276 may use one or more methodologies as known in the art for training the classifiers, for example, supervised training, semi-supervised training and/or unsupervised training. However, since the classifiers are applied to identify anomaly events which may be critical, the training may typically include supervised training in which a plurality of labeled sample images may be driven to the classifiers which may learn and adjust accordingly, for example, a neural network based classifier may adjust its internal structure, nodes, edges and/or weights to produce the classification matching the sample images labels.

In particular, the classifier trainer 276 may train the classifiers using training sample images captures at the specific scene 210 in which the classier 250 is deployed such that each classifier 250 is specifically adapted to the specific scene 210 to which it is assigned. Moreover, the classier 250 may further adapt, adjust, evolve and learn in run-time after deployed according to the classification data received from the analysis tool(s) 270.

The context based ML model trainer 278 may be configured to train the context based ML model 252 using similar techniques as used by the classifier trainer 276 to train the classifiers. The context based ML model 252 which may be typically utilized by a neural network may be trained as known in the art using supervised training, semi-supervised training and/or unsupervised training. However, as explained for the classifier trainer 276, the context based ML model trainer 278 may typically apply supervised training to train the context based ML model 252 using a plurality of labeled sample classification data generated by a classifier such as the classifier 250 coupled with contextual attributes associated with the scene 210 in which the context based ML model 252 is deployed such that each context based ML model 252 is specifically adapted to the specific scene 210 to which it is assigned.

As described herein before, the Moreover, the context based ML model 252 may further adapt, adjust, evolve and learn in run-time after deployed according to the historical classification data received from the analysis tool(s) 270.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms ML models and neural networks are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for visually identifying anomaly events using, at an edge node, a context based Machine Learning model (ML) that increases a performance of the edge node, comprising:
    said edge node comprising at least one processor configured to execute a program code, the program code comprising:
        code instructions to apply, by the at least one processor of said edge node, a limited resources classifier to a plurality of images captured by at least one imaging sensor deployed to monitor a certain scene relating to a certain area to classify at least one object detected in at least one image of the plurality of images;
        code instructions to apply, by the at least one processor of said edge node, a trained context based Machine Learning (ML) model to classification data generated by the limited resources classifier to compute, by said trained context based ML model applied at said edge node, an anomaly score for at least one potential anomaly event relating to the at least one detected object based on at least one contextual attribute associated with the certain scene, wherein said at least one contextual attribute is derived by said trained context based ML model applied at said edge node, wherein said classification data comprises metadata relating to one or more objects, actions, events, conditions, situations, states, and scenarios detected in the plurality of images; and
        code instructions to transmit the at least one image from the edge node to a remote server in cases where the anomaly score exceeds a first threshold, wherein the remote server is configured to apply at least one high performance visual analysis tool to visually analyze the at least one image in order to identify the at least one potential anomaly event.

2. The system of claim 1, wherein the at least one contextual attribute relates to a size of the at least one object detected in the at least one image.

3. The system of claim 1, wherein the at least one contextual attribute relates to a position of the at least one object detected in the at least one image.

4. The system of claim 1, wherein the at least one contextual attribute relates to a dynamic location of at least one object tracked in a plurality of consecutive images of the plurality of images.

5. The system of claim 1, wherein the at least one contextual attribute relates to an aspect ratio of the at least one detected object.

6. The system of claim 1, wherein the at least one contextual attribute relates to at least one environmental condition of a plurality of environmental conditions identified in the at least one image, the at least one environmental condition is a member of a group consisting of: an illumination condition, a visibility condition and a weather condition.

7. The system of claim 1, wherein the at least one contextual attribute is learned by the trained context based ML model based on historical classification data analyzed and labeled accordingly by the remote server using the at least one high performance visual analysis tool.

8. The system of claim 1, wherein the at least one processor of the edge node is further configured to transmit to the remote server at least one background image of the certain scene, wherein the at least one processor creates the at least one background image by applying at least one background subtraction tool to at least some of the plurality of images.

9. The system of claim 8, wherein the at least one processor is configured to transmit at least one updated background image of the certain scene according to at least one operation mode, wherein the at least one operation mode is a member of a group consisting of: periodically, in response to at least one change detected in the certain scene and on request by the remote server.

10. The system of claim 8, wherein the trained context based ML model is further configured to compute the anomaly score for the at least one potential anomaly event based on a distance of the at least one detected object from the at least one imaging sensor, wherein the distance is determined based on depth data computed for the certain scene by the remote server based on the at least one background image of the certain scene received from the edge node.

11. The system of claim 8, wherein the trained context based ML model is further configured to compute the anomaly score for the at least one potential anomaly event based on segmentation of a background of the certain scene, generated by the remote server based on the at least one background image of the certain scene received from the edge node.

12. The system of claim 1, wherein the at least one processor is further configured to further analyze the at least one image in cases where the anomaly score exceeds a second threshold lower than the first threshold by:
    applying the limited resources classifier to at least one region of interest cropped from the at least one to generate refined classification data, applying the trained context based ML model to the refined classification data generated by the limited resources classifier to compute a refined anomaly score for the at least one potential anomaly event, and transmitting the at least one image to the remote server in cases where the refined anomaly score exceeds the first threshold.

13. The system of claim 1, wherein the at least one potential anomaly event relates to a presence of the at least one object detected in the certain scene.

14. The system of claim 1, wherein the at least one potential anomaly event relates to at least one action conducted by the at least one object detected in the certain scene.

15. The system of claim 1, wherein the limited resources classifier is configured for high false positive detection to reduce false negative anomaly detections at an expense of increased false positive anomaly detections.

16. The system of claim 1, wherein down-sampling is conducted on at least some of the plurality of images prior to applying the limited resources classifier.

17. The system of claim 1, wherein said system further comprises a plurality of edge nodes at a plurality of locations, wherein each edge node of said plurality of edge nodes executes one or more classifiers each coupled with a respective one of a plurality of trained context based ML models, and wherein each of the plurality of trained context based ML models is trained on a different scene.

18. A method of visually identifying anomaly events using, at an edge node, a context based Machine Learning model (ML) that increases a performance of the edge node, comprising:

using at least one processor of said edge node for:
applying, by the at least one processor of said edge node, a limited resources classifier to a plurality of images captured by at least one imaging sensor deployed to monitor a certain scene relating to a certain area to classify at least one object detected in at least one image of the plurality of images;
applying, by the at least one processor of said edge node, a trained context based Machine Learning (ML) model to classification data generated by the limited resources classifier to compute, by said trained context based ML model applied at said edge node, an anomaly score for at least one potential anomaly event relating to the at least one detected object based on at least one contextual attribute associated with the certain scene, wherein said at least one contextual attribute is derived by said trained context based ML model applied at said edge node, wherein said classification data comprises metadata relating to one or more objects, actions, events, conditions, situations, states, and scenarios detected in the plurality of images; and
transmitting the at least one image of the plurality of images from the edge node to a remote server in cases where the anomaly score exceeds a first threshold, wherein the remote server is configured to apply at least one high performance visual analysis tool to visually analyze the at least one image of the plurality of images in order to identify the at least one potential anomaly event.

19. A computer program product for visually identifying anomaly events using, at an edge node, a context based Machine Learning model (ML) that increases a performance of the edge node, comprising:

at least one non-transitory computer readable storage media having thereon:
first program instructions executable by at least one processor of said edge node to cause the at least one processor of said edge node to apply a limited resources classifier to a plurality of images captured by at least one imaging sensor deployed to monitor a certain scene relating to a certain area to classify at least one object detected in at least one image of the plurality of images;
second program instructions executable by the at least one processor of said edge node to cause the at least one processor of said edge node to apply a trained context based Machine Learning (ML) model to classification data generated by the limited resources classifier to compute, by said trained context based ML model applied at said edge node, an anomaly score for at least one potential anomaly event relating to the at least one detected object based on at least one contextual attribute associated with the certain scene, wherein said at least one contextual attribute is derived by said trained context based ML model applied at said edge node, wherein said classification data comprises metadata relating to one or more objects, actions, events, conditions, situations, states, and scenarios detected in the plurality of images; and
third program instructions executable by the at least one processor of said edge node to cause the at least one processor of said edge node to transmit the at least one image of the plurality of images from the edge node to a remote server in cases where the anomaly score exceeds a first threshold, wherein the remote server is configured to apply at least one high performance visual analysis tool to visually analyze the at least one image of the plurality of images in order to identify the at least one potential anomaly event.

* * * * *